United States Patent [19]

Musiel et al.

[11] Patent Number: 5,378,422
[45] Date of Patent: Jan. 3, 1995

[54] MOLDING MECHANISM FOR THE IN-MOLD FORMATION AND ASSEMBLY OF AN ACTUATOR-OVERCAP AND AN INSERT NOZZLE AND METHOD FOR USING SUCH MECHANISM

[75] Inventors: D. James Musiel, Racine, Wis.; William C. Hadsell, Phoenix; Craig R. Oestreich, Scottsdale, both of Ariz.

[73] Assignee: S. C. Johnson & Son, Inc., Racine, Wis.

[21] Appl. No.: 202,667

[22] Filed: Feb. 25, 1994

Related U.S. Application Data

[63] Continuation of Ser. No. 820,841, Jan. 15, 1992, abandoned.

[51] Int. Cl.⁶ .......................................... B29C 45/03
[52] U.S. Cl. ................................ 264/238; 264/328.8; 425/556; 425/588
[58] Field of Search ............... 264/238, 297.2, 297.8, 264/328.8; 425/588, 556

[56] References Cited

U.S. PATENT DOCUMENTS

| | | |
|---|---|---|
| 3,013,308 | 12/1961 | Armour ................................ 264/238 |
| 3,064,310 | 11/1962 | Cooprider ........................ 264/336 X |
| 3,223,287 | 12/1965 | Sagarin . |
| 3,657,407 | 4/1972 | Gronemeyer et al. .......... 425/588 X |
| 4,253,609 | 3/1981 | Laauwe . |
| 4,340,352 | 7/1982 | Hayberg ......................... 264/238 X |
| 4,351,630 | 9/1982 | Hayberg et al. ................ 264/238 X |
| 4,547,332 | 10/1985 | Drozd, Jr. ....................... 264/310 X |
| 4,732,726 | 3/1988 | Grannen, III ................... 425/588 X |
| 4,741,088 | 5/1988 | Ramella . |
| 4,783,056 | 11/1988 | Abrams ........................... 264/238 X |
| 4,812,116 | 3/1989 | Abrams ........................... 425/556 X |
| 4,897,032 | 1/1990 | Corteggiani . |
| 5,037,597 | 8/1991 | McGinley et al. .................. 264/238 |

*Primary Examiner*—Karen Aftergut

[57] ABSTRACT

A molding mechanism and method of using that mechanism for simultaneously forming, by injection molding, two molded parts intended to be interference fit together and then, while the two molded parts are still within the molding mechanism, repositioning them and fitting them together. The sequenced interplay of the moving parts of the molding mechanism which accomplishes this process may be controlled by either a two-part or a single-part camming mechanism. The two molded parts may be an actuator-overcap and a spray nozzle insert.

20 Claims, 15 Drawing Sheets

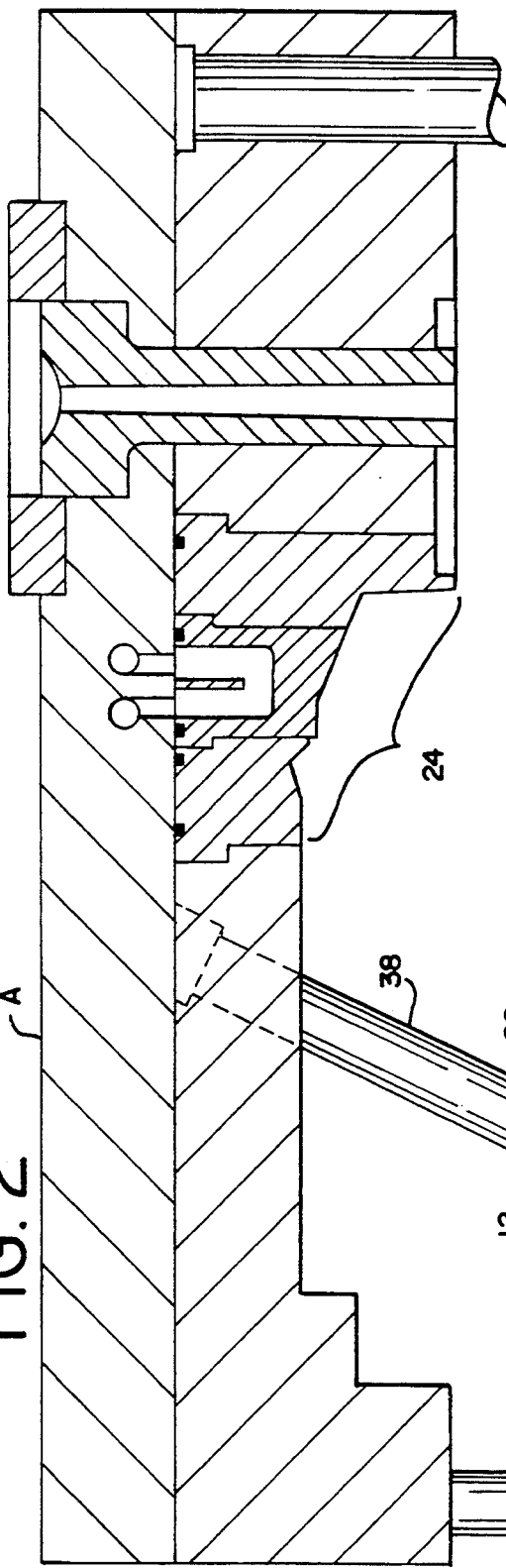
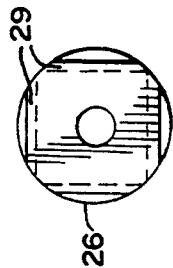
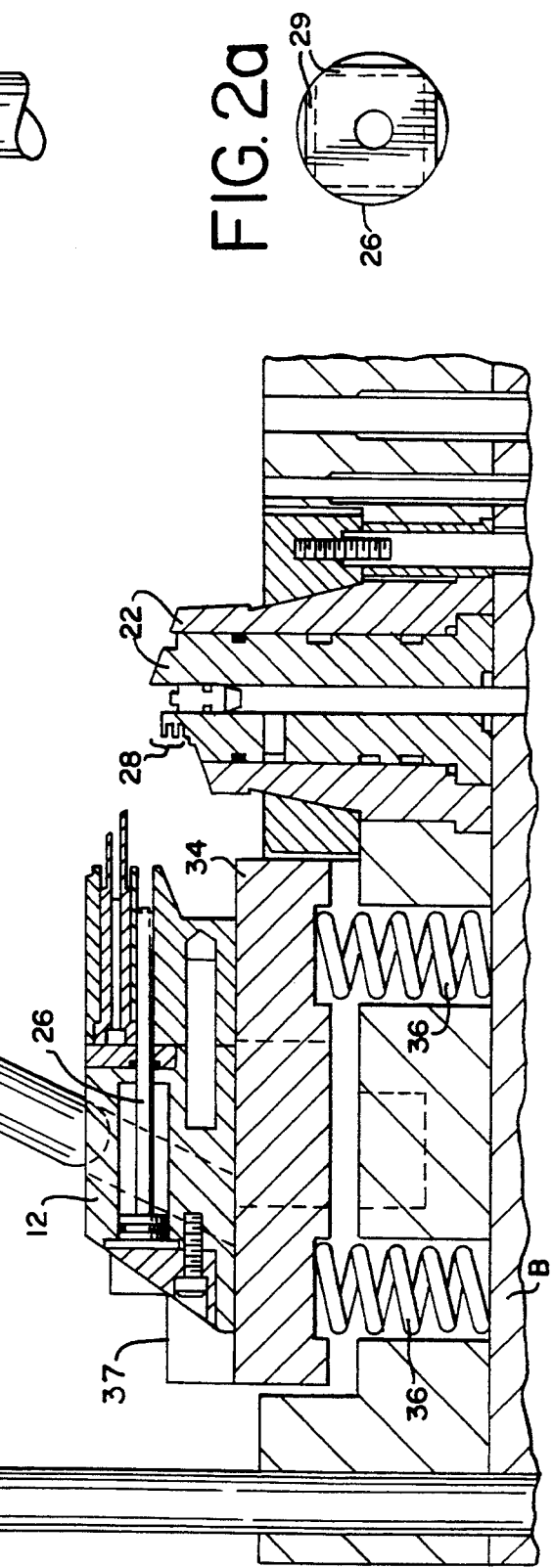

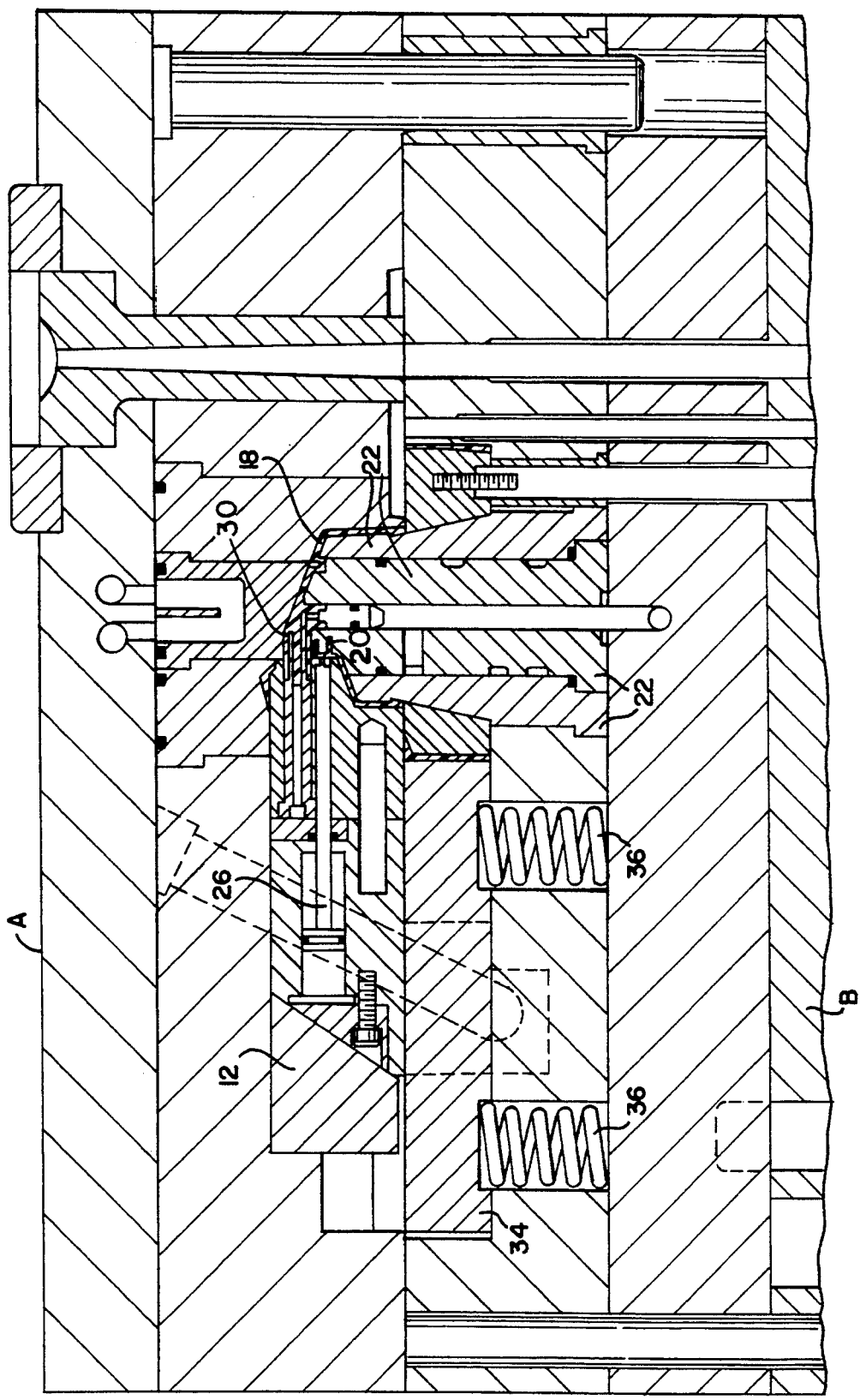

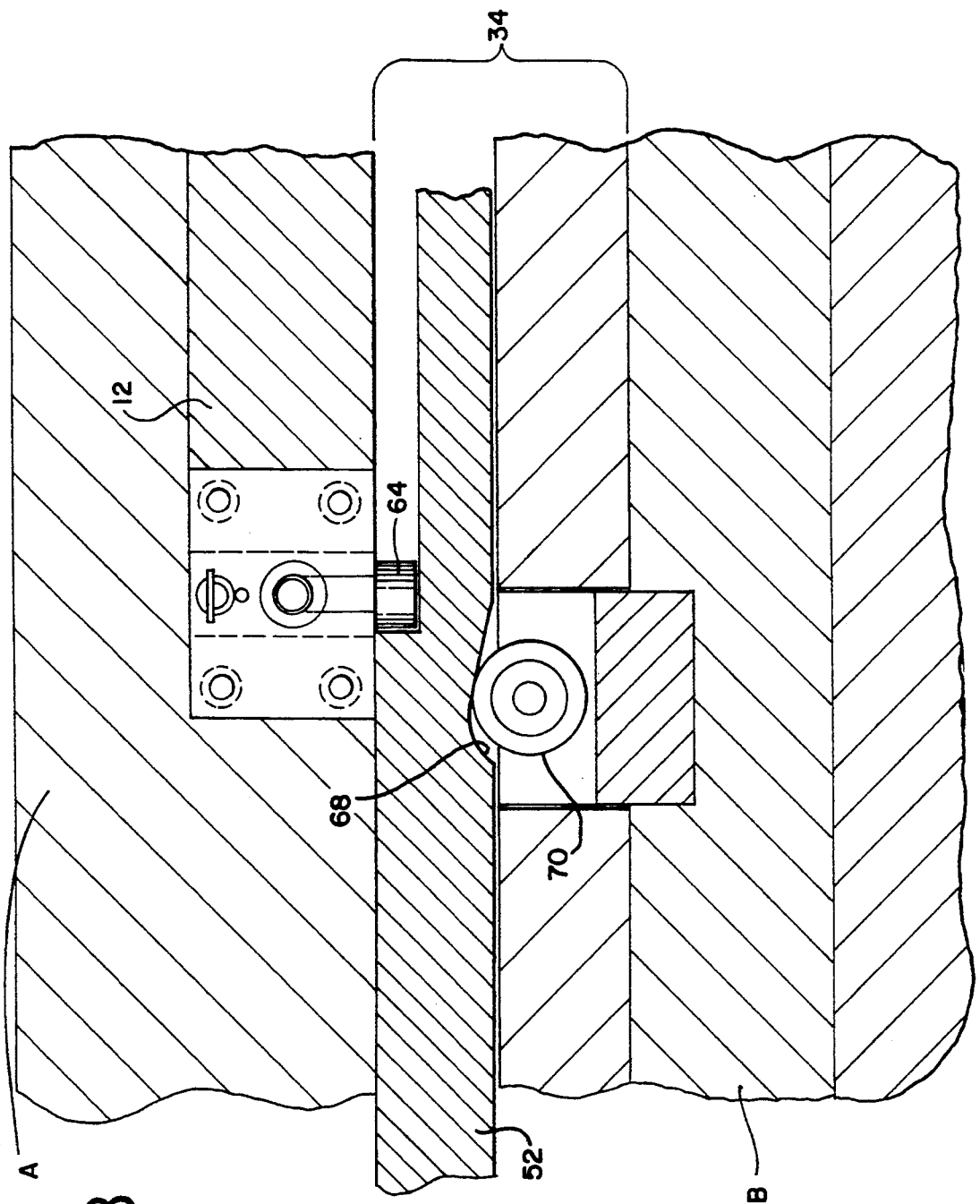

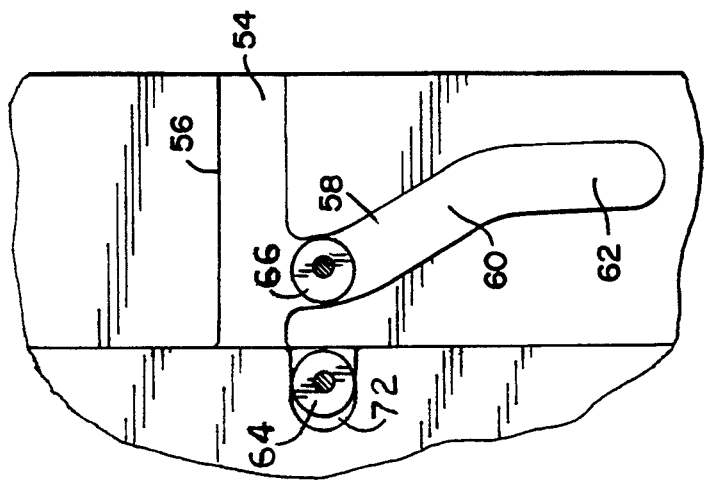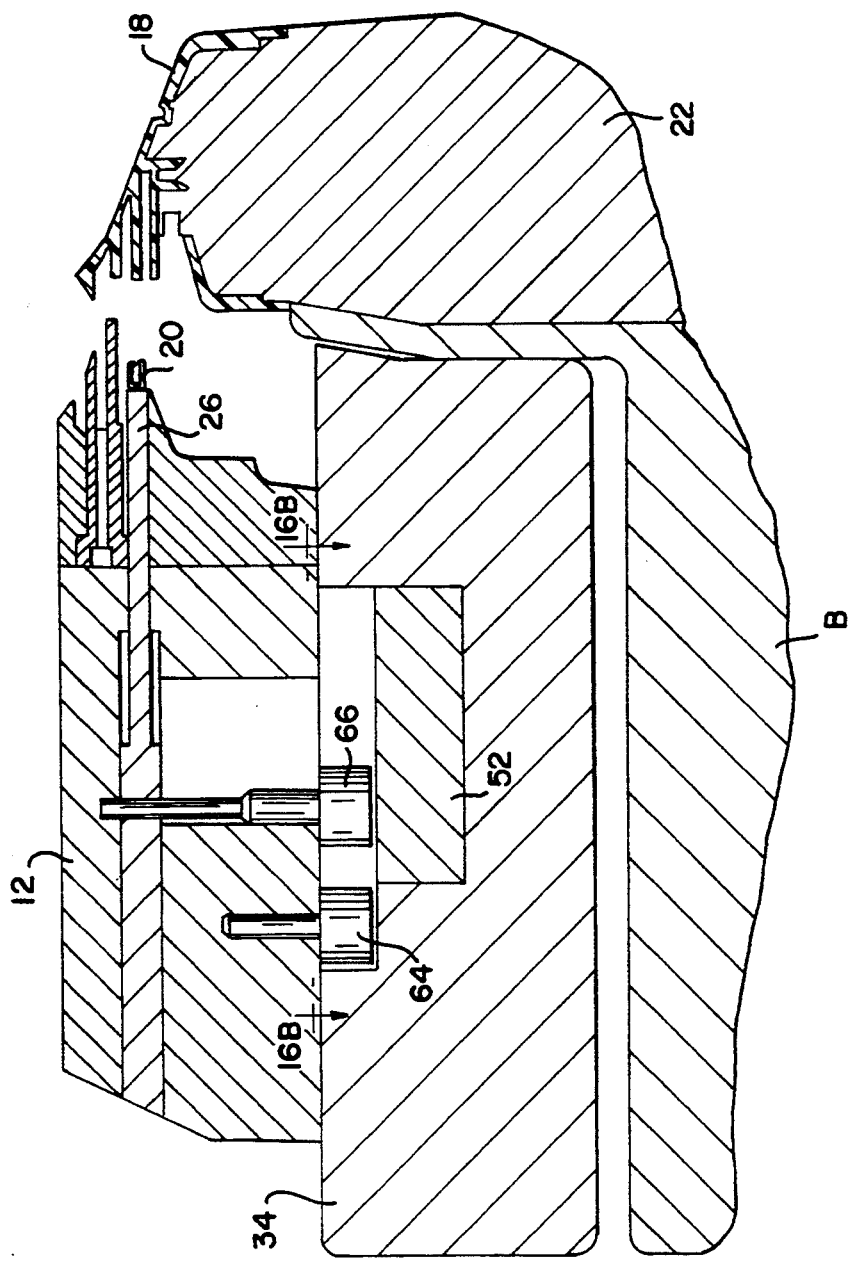

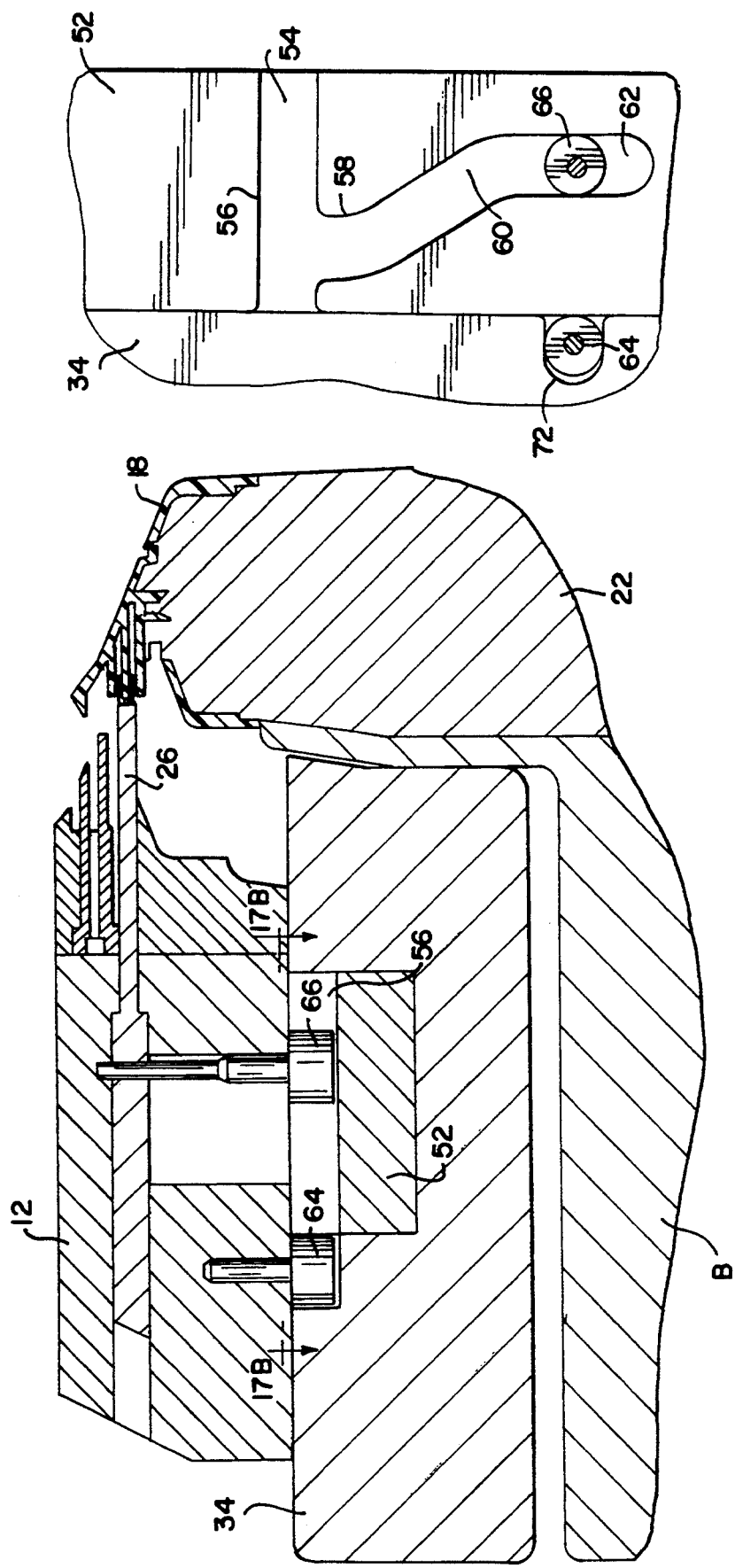

MOLDING MECHANISM FOR THE IN-MOLD FORMATION AND ASSEMBLY OF AN ACTUATOR-OVERCAP AND AN INSERT NOZZLE AND METHOD FOR USING SUCH MECHANISM

This application is a continuation of application Ser. No. 07/820,841, filed Jan. 15, 1992, now abandoned.

TECHNICAL FIELD

This invention relates to the field of injection molding and assembling of plastic parts, and particularly to a molding mechanism for simultaneous formation of an actuator-overcap and a spray nozzle insert followed by in-mold assembly of the two parts.

BACKGROUND ART

The molding of overcaps for pressurized containers with integrally formed actuators designed to interact with a stem protruding from the top of the container to release the contents is well known. Such actuator-overcaps have an integrally formed fluid releasing channel that, at the inlet end, connects with the container stem. At the outlet end of the channel is usually inserted a spray forming nozzle which can have a swirl, flow restricting or nebulizing chamber as well as a discharge orifice. The chamber and orifice sizes and configurations are adjusted to provide the desired spray pattern and droplet size.

The usual method of formation of such an actuator-overcap nozzle assembly is to individually mold the actuator-overcap and the nozzle insert from thermoplastic material. Then, in a secondary assembly operation, the nozzle is pressed with interference fit into the outlet opening of the fluid releasing channel of the actuator-overcap.

This subsequent assembly step means that the two types of parts must be made, stored and handled, and then manually fitted together or fed to an assembly machine. The separate formation of the two parts also means that, unless all operations are conducted under controlled conditions, environmental conditions such as heat and humidity may differ between the formation of the actuator-overcap and the nozzle insert. Since the two are to be interference-fit together, tolerances are small, and minute variations in the behavior of the thermoplastic in the molding process may result in a larger proportion of non-secure fits.

Both problems—of labor and of control of conditions—would be solved by single step formation of the entire assembly. However, molding the actuator-overcap and nozzle insert as a single unit is not possible, due to molding technique restrictions. Simultaneous in-mold formation and assembly of the two parts would also solve the problems discussed above.

The integral molding of caps for dispensers having a plug portion attached to the cap portion is well known. U.S. Pat. No. 4,253,609 to Laauwe, "Dispensing Spray Nozzle", is of this type. The in-mold assembly of such articles is also known. U.S. Pat. No. 4,340,352 to Hayberg, "Hinge Exercising Mechanism," discloses a molding mechanism having a moveable finger which, after the cap-lid combination is molded, sweeps over the lid portion and snaps it into the cap portion.

A method of assembling and forming a delivery head and a break-up insert attached to the head by an attachment strip is disclosed in U.S. Pat. No. 4,741,088 to Ramella, "Method of Making a Delivery Head For Containers of Substances To Be Nebulized Having A Break-Up Plastic Insert Integrally Formed With The Head". When the mold parts separate, a mold fence first pushes against the attachment strip and swings it up against the head, forcing the insert into the outlet opening of the head, which is then stripped from the mold.

SUMMARY DISCLOSURE OF THE INVENTION

The present invention is a molding mechanism that will form and assemble an actuator-overcap with a nozzle insert in a single operation. A push rod, moveably mounted on a slide attached to one portion of the mold has a pin on its end that forms the discharge orifice of the nozzle insert. Then, the mold is opened, the slide moves laterally and axially separating the nozzle insert from its forming position, then repositioning it, and inserting it into the discharge outlet of the actuator-overcap. A swirl chamber is formed between the interior end of the nozzle insert and the protruding end of the fluid outlet of the actuator-overcap.

BRIEF DESCRIPTION OF THE DRAWINGS

FIGS. 1–13 illustrate a first embodiment of the invention.

FIG. 1 is a perspective view of the molding mechanism, showing the A and B components in the separated position.

FIG. 2 is a partial side sectional view of the molding mechanism, taken along line 2—2 of FIG. 1, showing the A and B mold components in the separated position and the insert engaging pin retracted, before the actuator-overcap has been molded.

FIG. 2a is an elevational view of the end of the insert engaging pin.

FIG. 3 is a partial sectional view of the same elements as FIG. 2 but with the A and B mold components in the joined position and the actuator-overcap and the spray nozzle insert formed therebetween.

FIG. 4 shows the same view and elements as FIG. 3 but with the mold components in the opened position, the insert engaging pin extended, and the spray nozzle insert repositioned and inserted within the actuator-overcap.

FIG. 5 is an enlarged detail side sectional view showing mold components A and B as shown in FIG. 2 in their joined position with the actuator-overcap and spray nozzle insert formed therebetween, with the insert engaging pin in contact with the formed spray nozzle insert.

FIG. 6 shows the same view and elements as FIG. 5, but with the A and B mold components in the joined position with the insert engaging pin and spray nozzle insert all repositioned ready for assembly.

FIG. 7 shows the same view and elements as FIG. 5 but with the insert engaging pin in its extended position and the spray nozzle insert fitted within the actuator-overcap.

FIG. 8 is a partially sectioned perspective view of the molded and assembled actuator-overcap and spray nozzle insert.

FIG. 9 is a partial plan view of the cam mechanism of the molding mechanism in the fully opened position.

FIG. 10 shows the same elements as FIG. 9 but in relative positions as the mold closes.

FIG. 11 shows the same elements as FIG. 9 but with the mold in a fully closed position.

FIG. 12 shows the same elements as FIG. 9 but in relative positions as the mold opens.

FIG. 13 shows the same elements as FIG. 9 but with the mold in the fully opened position.

FIGS. 14A-18B illustrate a second embodiment of the invention.

FIG. 14A shows, in partial side sectional view, the functional elements of the second embodiment in positions that correspond with those of the molding mechanism of FIG. 3.

FIG. 15B, taken along a section line at right angles to FIG. 14A, shows a partial side sectional view of the moving cam bar and cam roller.

FIG. 16A shows the same elements depicted in FIG. 15A but in positions corresponding to the repositioning of the inserting pin.

FIG. 16B, taken along line 16B—16B of FIG. 16A, shows the same elements depicted in FIG. 14B but in positions corresponding to FIG. 16A.

FIG. 17A shows the same elements depicted in FIG. 15A but in positions corresponding to FIG. 4.

FIG. 17B, taken along line 17B—17B of FIG. 17A, shows the same elements depicted in FIG. 14B but in positions corresponding with FIG. 17A.

FIG. 18B taken along line 18B—18B of FIG. 18A shows the same elements as FIG. 14B, but in positions corresponding with FIG. 18A.

BEST MODES FOR CARRYING OUT THE INVENTION

The essence of this invention is the sequenced interplay of the particular components of the molding mechanism. However, such sequenced interplay can be obtained by different mechanisms for the timed and spaced transfer of energy, and by different means for energizing such mechanisms. The essential components of the molding mechanism and the necessary sequence of relative motions of those components to accomplish the in-mold formation and assembly of an actuator-overcap and spray nozzle insert are discussed here with two possible mechanisms for the control of the sequenced interplay of the components. These two embodiments have been tested and both have proved fully functional. However, other mechanisms and other means of energizing the mechanisms could be utilized to control the sequenced interplay of the components of the molding mechanism.

FIGS. 1-13 illustrate a first embodiment of the invention, in which the mechanisms for controlling the relative motions of the components of the molding mechanism are interrelated but distinct. FIGS. 14A-18B illustrate a second embodiment of the invention, which is described in less detail than in the first embodiment, since the essential components of the molding mechanism remain the same but the mechanism for controlling the relative motions of those components is different. In this second embodiment, a single mechanism serves to sequentially activate the various components.

Figure 1:
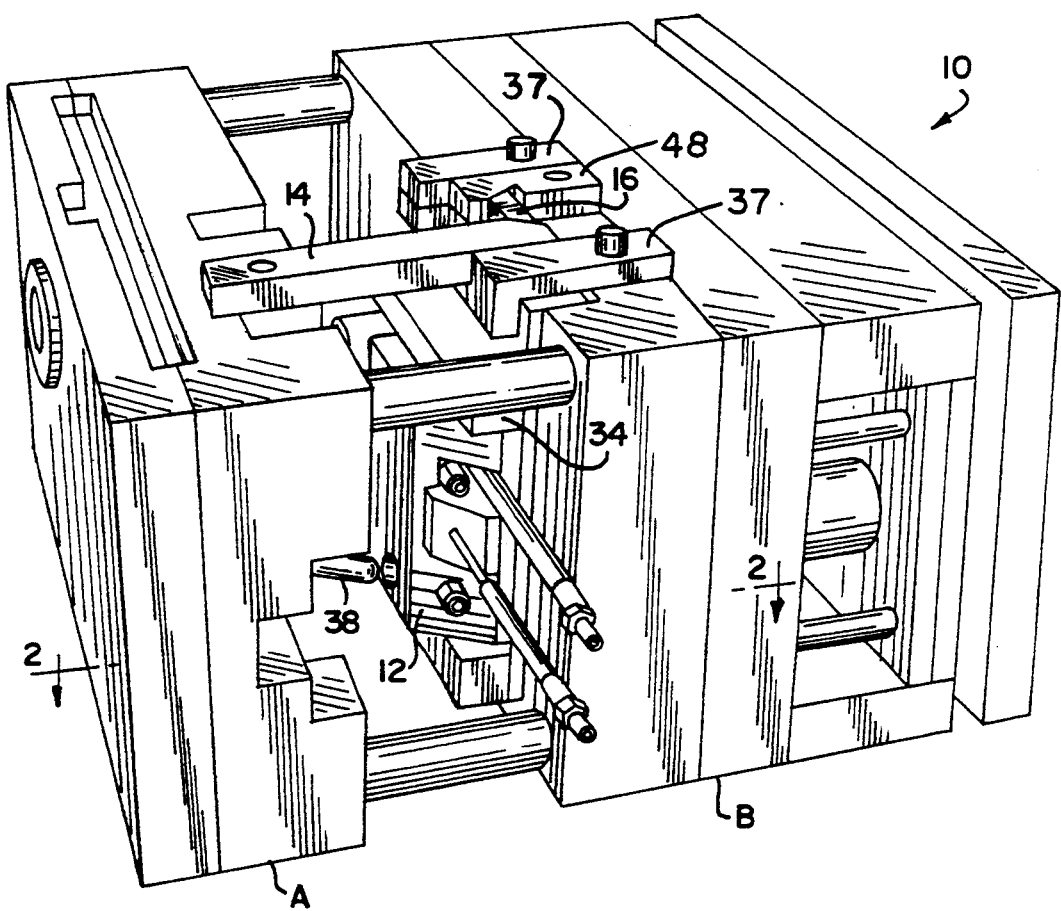

FIG. 1 shows a perspective view of molding mechanism 10 which has two major components—mold component A, as the stationary part of a mold assembly is customarily termed, and mold component B, as the moving part of a mold assembly is customarily termed. These two components are slidably joined by bars, as is well known to those skilled in the art, so such structure is not discussed here. Nor are the conventional and required cooling mechanisms for such molding mechanisms discussed. Detachably connected to mold component B is slide 12, which is a component of the means for repositioning and inserting the spray nozzle insert into the actuator-overcap. Located upon mold component A is stationary cam bar 14, which is designed to operatively interconnect with moveable cam 16 located upon mold component B.

Figure 4:
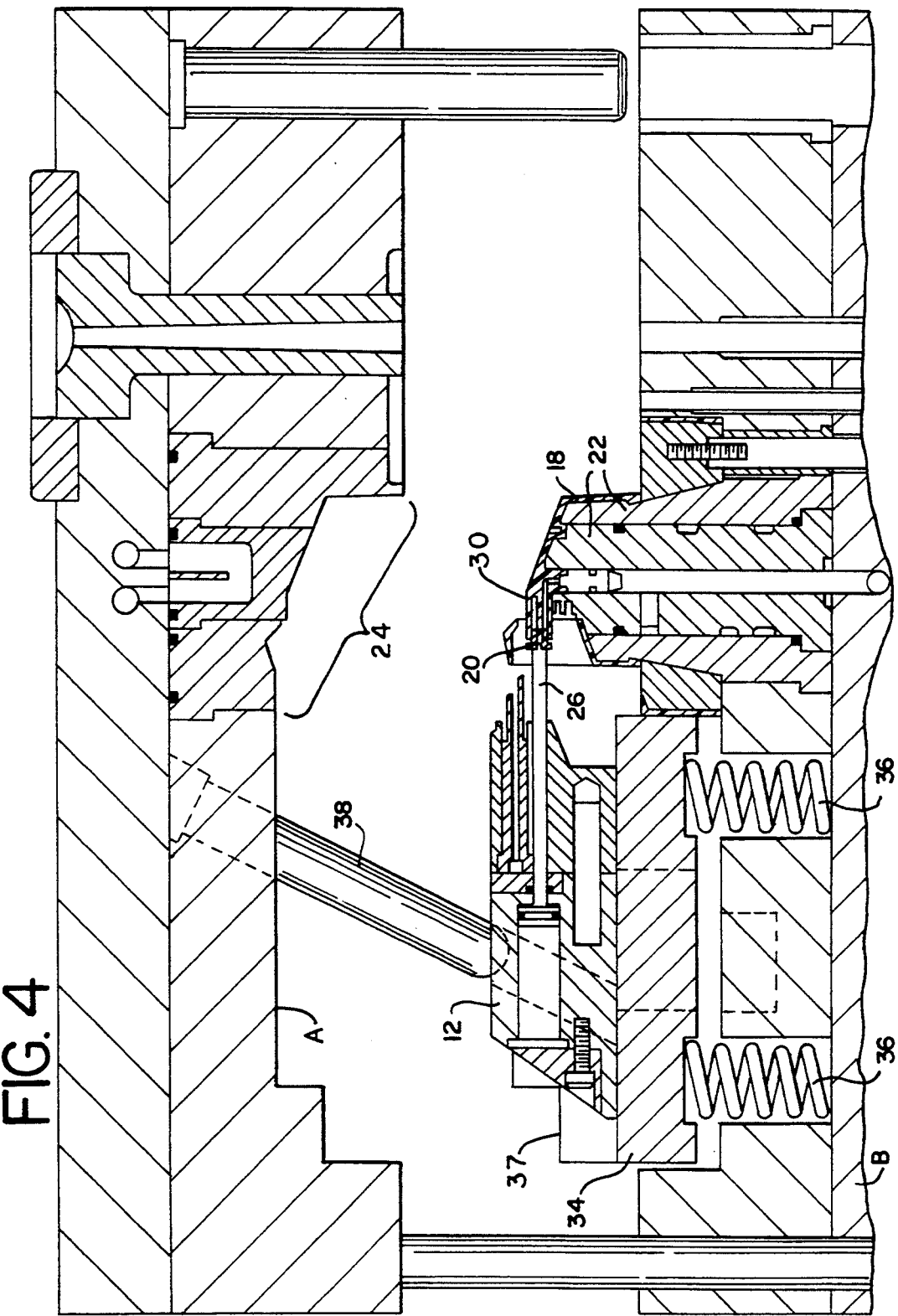
Figure 5:
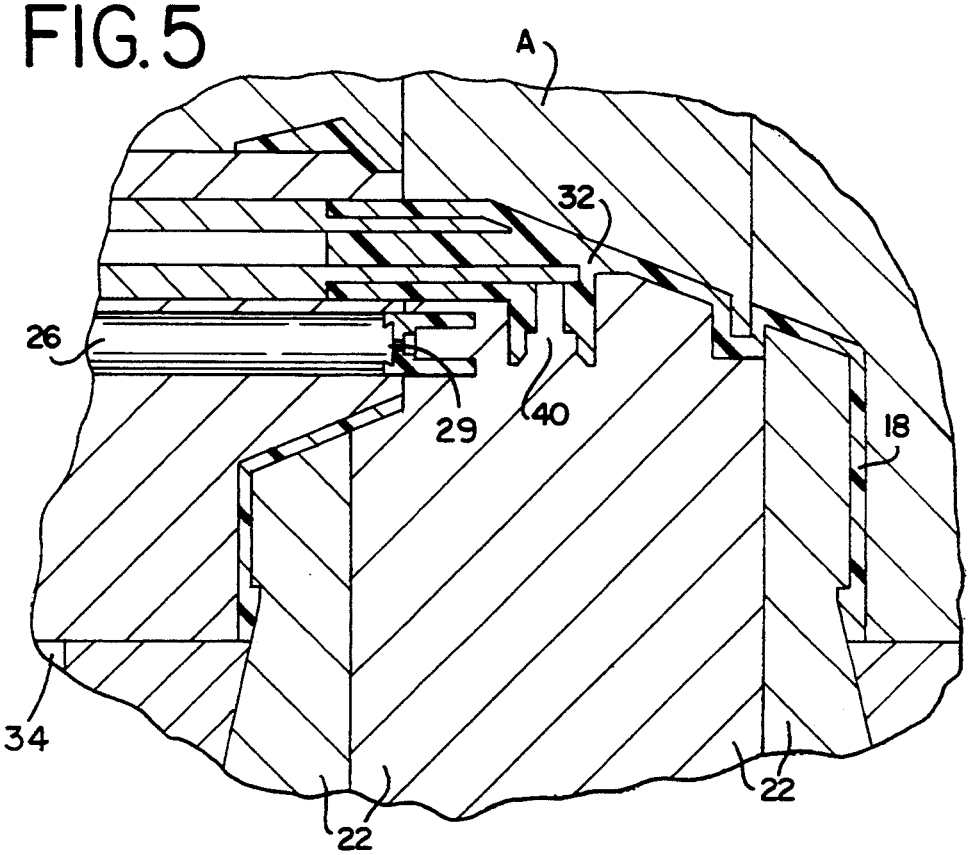
Figure 6:
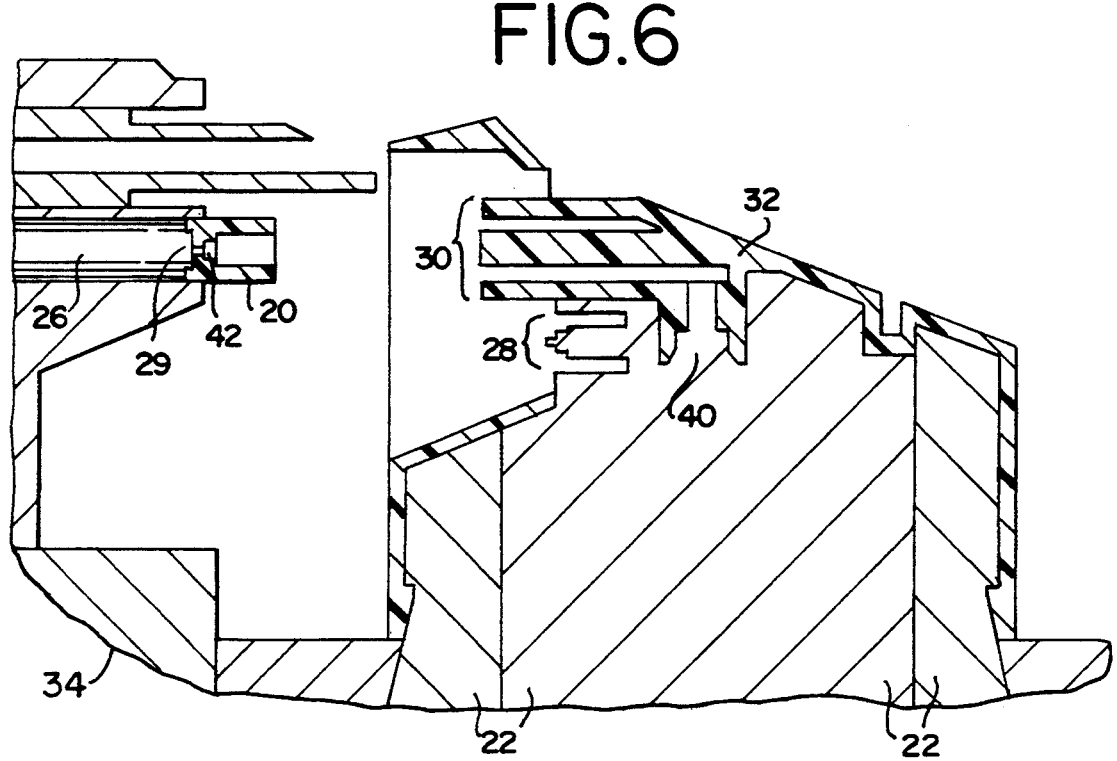
Figure 7:
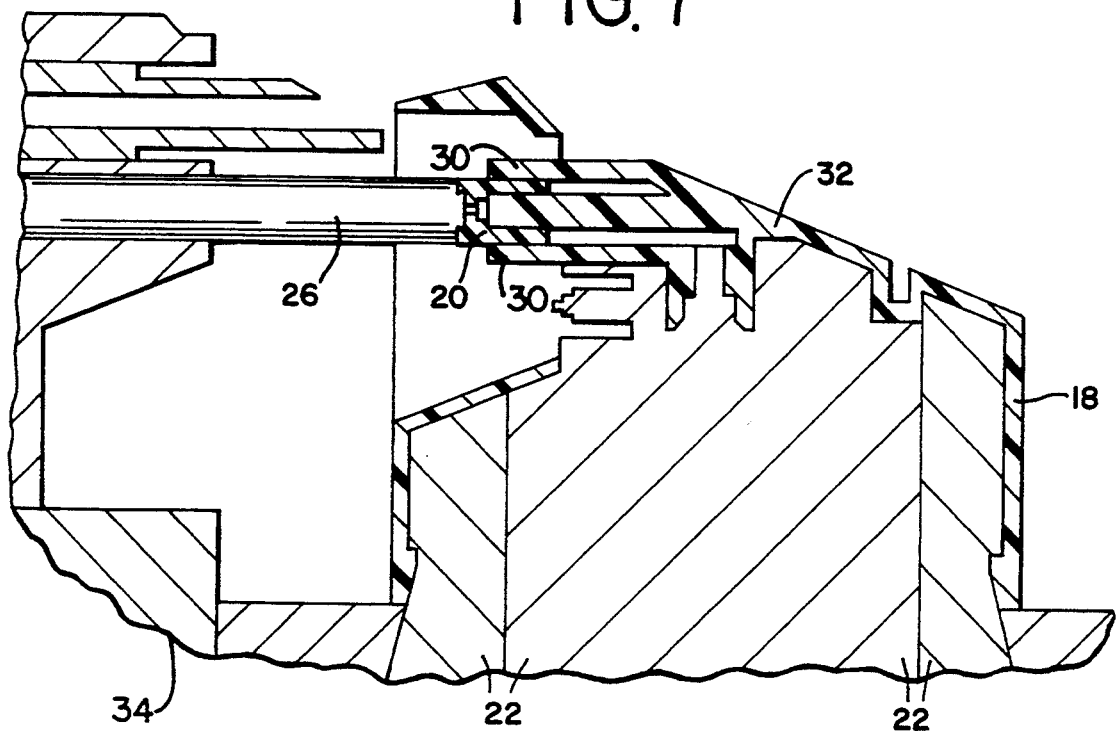

FIGS. 2-4 show the molding and assembly of the actuator-overcap and spray nozzle insert in the context of the total molding mechanism. FIGS. 5-7 show, in simplified detail for clarity, the in-mold assembly of the actuator-overcap and the spray nozzle insert. FIGS. 9-13 show the mechanism by which the motions of the parts of the molding mechanism are accomplished.

FIG. 2 shows mold component A and mold component B separated, before molding has taken place. Forming part of and protruding from mold component B is actuator-overcap forming core 22, which is designed to fit against and form a mold with actuator-overcap forming cavity 24 formed within mold component A. Actuator-overcap forming cavity 24 is actually, as more easily seen in FIG. 3, only a portion of the required mold structure, the "front" portion of the actuator-overcap mold structure being formed by the configuration of slide 12 and insert engaging pin 26. Insert forming cavity 28 is formed within actuator-overcap forming core 22.

Detachably connected to mold component B is an assembly made up of riser plate 34, which is extensibly connected to mold component B by springs 36, and slide 12, which is itself moveably connected to riser plate 34. Moveably located within slide 12 is insert engaging pin 26, which, together with insert forming cavity 28, creates the mold for spray nozzle insert 20. (See FIG. 6.)

In FIG. 2, insert engaging pin 26 is in its "retracted" position within slide 12.

As mold components A and B are joined to create the mold, the assembly formed by riser plate 34, slide 12, and insert engaging pin 26 is moved into molding position against mold component A along diagonally oriented diagonal cam pin 38 by pressure exerted on mold component B by the mold press into which the molding mechanism of the present invention will have been placed for operation.

As FIG. 3 shows, when mold component A and mold component B are joined, mold component A presses against slide 12 and thus applies pressure to riser plate 34 and compresses springs 36.

In this figure (and shown in expanded detail in FIG. 5), insert engaging pin 26 has been moved forward within slide 12 to its molding position so that insert engaging pin 26 is now located adjacent insert forming cavity 28. In this position, insert engaging pin 26, and insert forming cavity 28 together form the structure of the mold for spray nozzle insert 20.

Insert engaging pin 26 is so designed that, when spray nozzle insert 20 is molded from injected thermoplastic material, spray nozzle insert 20 becomes detachably engaged by pin indent 29 located around the tip of insert engaging pin 26.

Pin indent 29 is best visible in FIG. 2a (which shows a front elevational view of the tip of insert engaging pin 26) and FIGS. 5–7.

In FIG. 3 (and FIG. 5), the mold cavities formed between mold components A and B and insert engaging pin 26 are shown after the injection of thermoplastic material. Thus, actuator-overcap 18 and spray nozzle insert 20 have been formed, but not yet assembled.

After the injection molding has been completed, the molding and assembling mechanism of the present invention separates the formed spray nozzle insert from its molding location, repositions it, and then inserts it into the formed actuator-overcap. This is shown in FIGS. 6, 4, and 7.

As the stage depicted in FIG. 3 approaches that shown by FIG. 4, mold component B separates from mold component A, and springs 36 extend, pushing riser plate 34 away from the surface of mold component B. Riser stop 37 limits the extent of this separation motion. Simultaneously, slide 12 (carrying with it insert engaging pin 26), which is attached to riser plate 34, moves along diagonally oriented diagonal cam pin 38, moving laterally relative to riser plate 34 and axially away from formed actuator-overcap 18. This lateral and axial motion is necessary, for the tip of insert engaging pin 26 must pull formed spray nozzle insert 20 out of its molding position within insert forming cavity 28 far enough so that, as insert engaging pin 26 repositions spray nozzle insert 20 adjacent actuator-overcap outlet structure 30 of actuator-overcap 18, spray nozzle insert 20 clears the lip of actuator-overcap outlet structure 30.

After the assembly formed by riser plate 34, slide 12 and insert engaging pin 26 has moved to its extended position (out of contact with mold component B), spray nozzle insert 20, as said before, is in position opposite actuator-overcap outlet structure 30.

FIG. 6 shows a partial sectional view of this intermediate position, with insert engaging pin 26 holding spray nozzle insert 20 positioned for insertion into actuator-overcap outlet structure 30.

In the stage depicted in FIG. 7, mold components A and B have separated and insert engaging pin 26 is forced forward, by pneumatic pressure, to its inserting position, thus interference-fitting spray nozzle insert 20 into actuator-overcap outlet structure 30.

Figure 8:
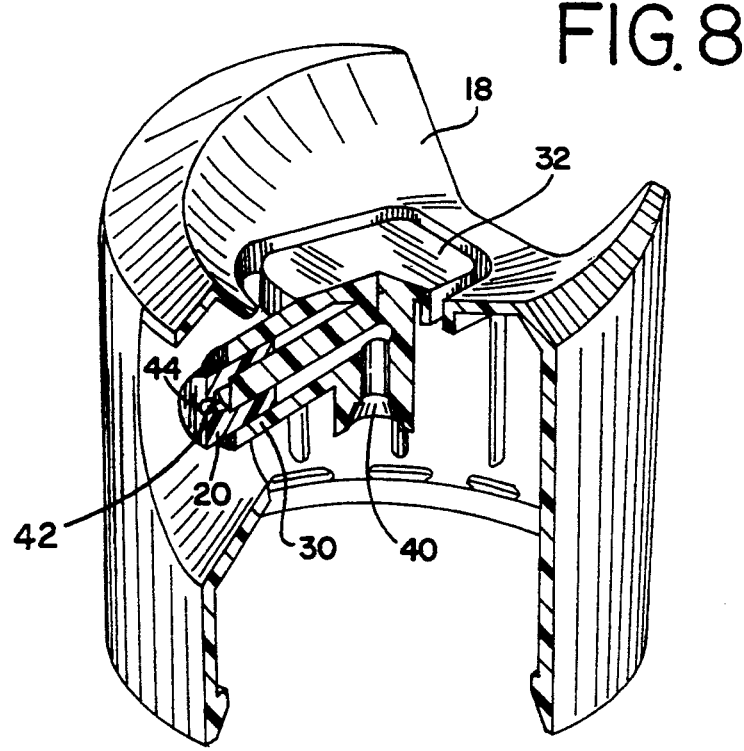

FIG. 8 shows (in a partially sectioned perspective) molded actuator-overcap 18, which has integrally formed therewith actuator button 32. Spray nozzle insert 20 has, by the molding and assembly method described, been interference fit into one end of actuator-overcap outlet structure 30 of actuator-overcap 18. In use, actuator-overcap 18 will sit over a fluid valve stem which projects from a reservoir. In the preferred embodiment (not shown here), the reservoir will be a conventional pressurized aerosol dispensing can with a fluid valve stem projecting from its top (although the actuator-overcap assembly could also be used with a pump-type dispenser). When the user depresses actuator button 32, the pressurized aerosol exits the valve stem, enters actuator-overcap fluid inlet 40, is directed out actuator-overcap outlet structure 30, enters swirl chamber 42 within spray nozzle insert 20, and finally exits spray discharge orifice 44.

FIGS. 9–13 show details of the mechanism which controls the operation of the in-mold formation and assembly of the actuator-overcap and spray nozzle insert as the mold is closed and then is opened.

Figure 9:
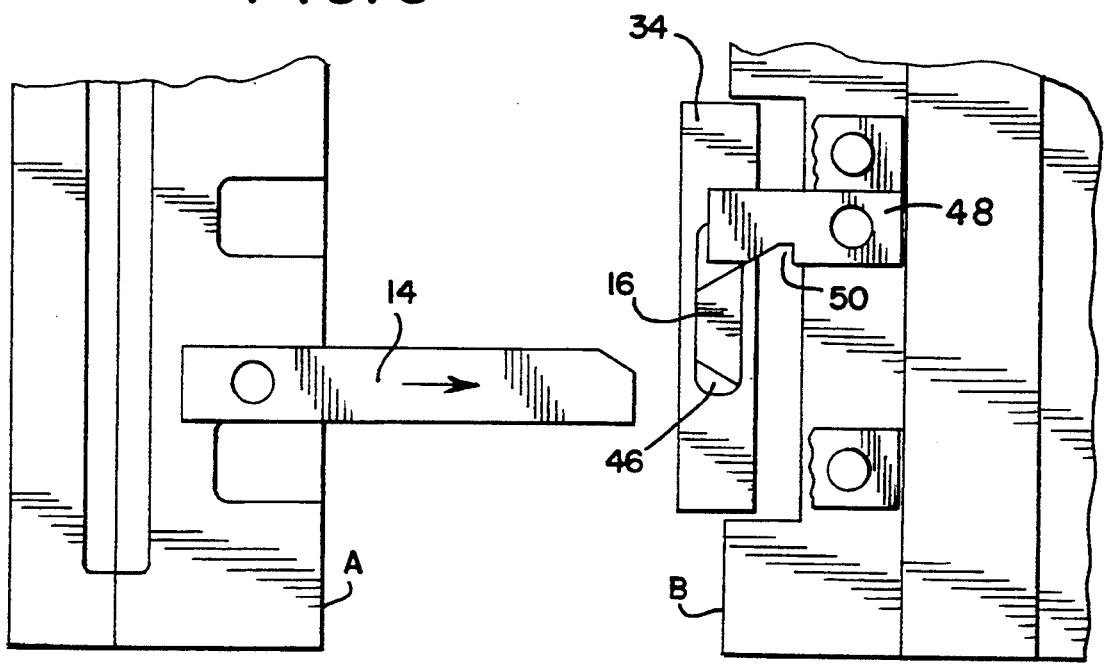

FIG. 9 shows, when mold components A and B are separated and before they are joined, the relative positions of the parts of the molding mechanism that control the timing of the motions of the various components of the molding mechanism. Located on mold component A is stationary cam bar 14. Located on top of riser plate 34 (which is detachably connected to slide 12, which in turn is operatively connected to mold component B and is best illustrated in FIGS. 2–4) is angled moveable cam 16, which is laterally moveable within cam slot 46. Located at one end of cam slot 46 is limit stop 48 which has limit notch 50 located therein.

When mold components A and B are separated, moveable cam 16 is in position within cam slot 46 and completely outside of limit notch 50. In this position, riser plate 34 is held away from the inner surface of mold component B by springs 36 (visible in FIGS. 2–4).

Figure 10:
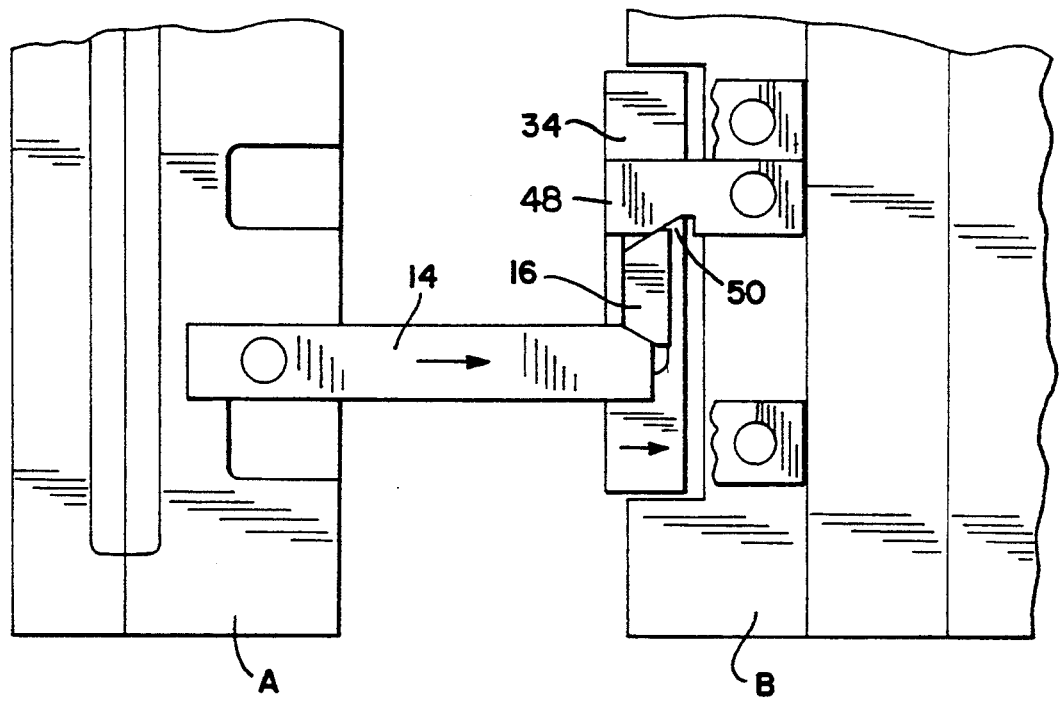

As mold components A and B move together, as shown in FIG. 10, the angled edge of stationary cam bar 14 comes into contact with and presses against the angled end of moveable cam 16. Moveable cam 16 is, by this pressure, moved within cam slot 46 in the direction of limit notch 50. Simultaneously, the pressure of stationary cam bar 14 against moveable cam 16 presses riser plate 34 to which slide 12 is connected back against the inner surface of mold component B.

Figure 11:
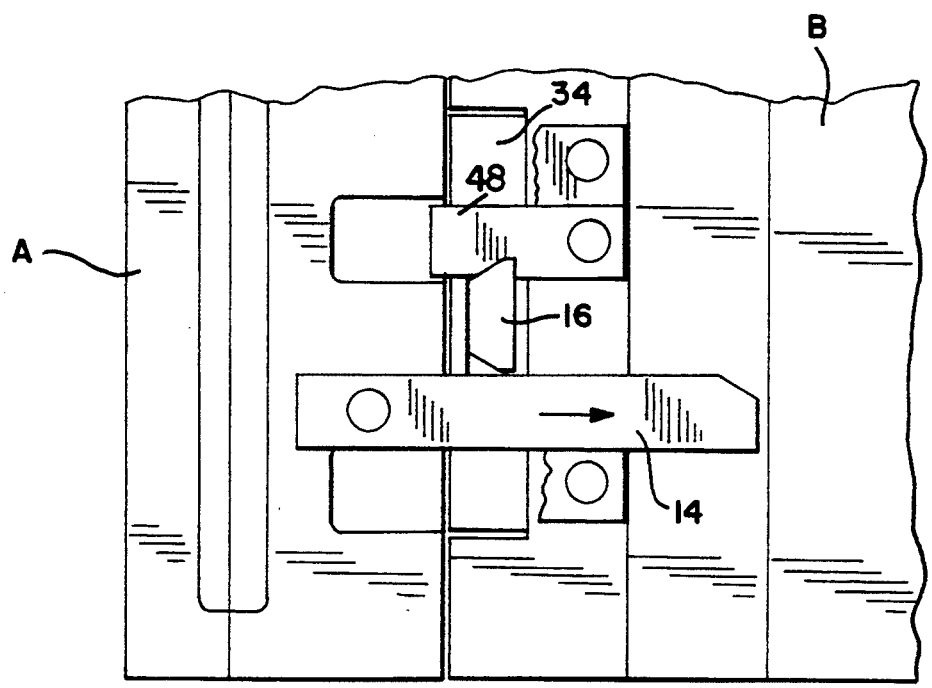

FIG. 11 shows mold components A and B joined, in the molding position (also shown in FIG. 3). Stationary cam bar 14 has pushed past moveable cam 16, and has moved moveable cam 16 within cam slot 46 and positioned moveable cam 16 against the back of and fully into limit notch 50.

Riser plate 34 is now pressed back against mold component B and springs 36 (not visible in this figure) are compressed.

Figure 12:
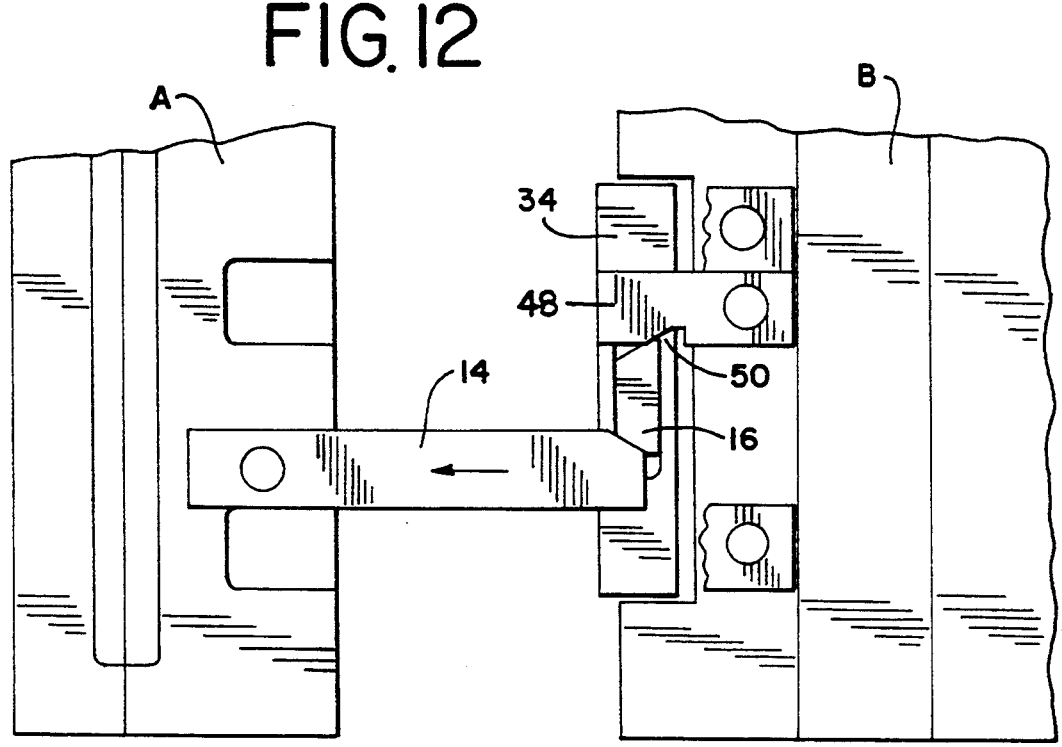
Figure 13:
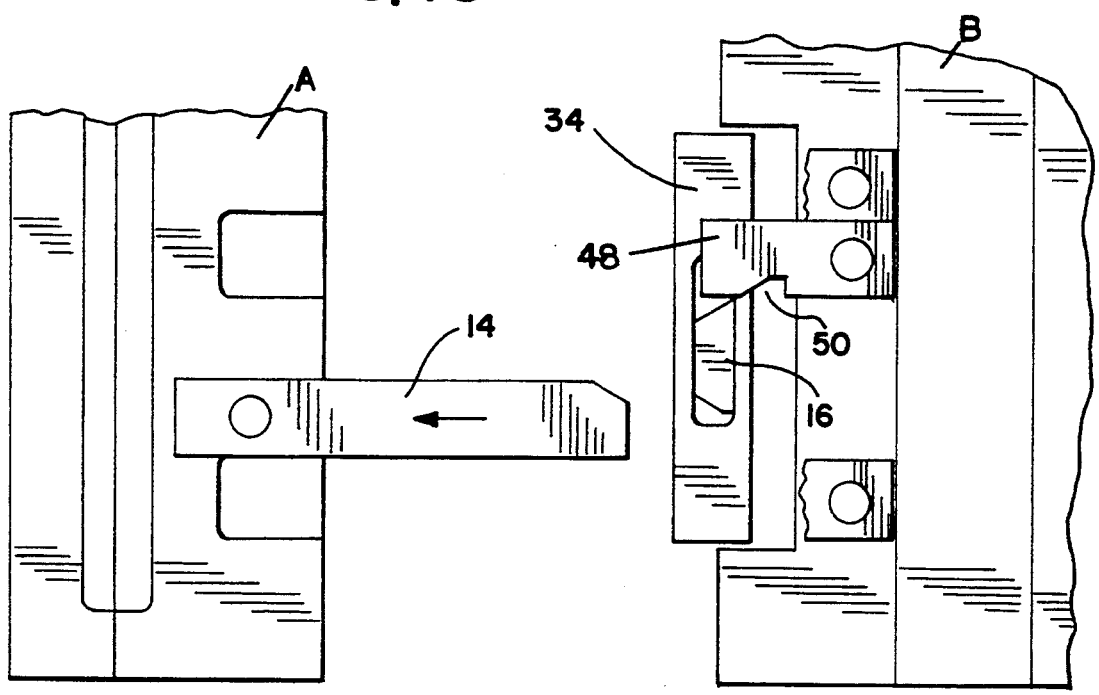

FIGS. 12 and 13 show that, as mold components A and B separate, after the injection molding, the relative motions of stationary cam bar 14 and moveable cam 16 repeat, in reverse, the motions depicted in FIGS. 10 and 9.

In a second embodiment of the invention (depicted in FIGS. 14A–18B), all the essential elements of the molding assembly and the necessary sequencing of steps are the same as in the first embodiment. Only the mechanism by which the relative actions of the riser plate, the slide, and the insert engaging pin are controlled is different. FIG. 1, described above, shows, located on the top portion of mold component A, stationary cam bar 14, and on mold component B, moveable cam 16, as well as limit stop 48. These elements are lacking in the second embodiment, for the cam mechanism is internal to the molding mechanism 10. Otherwise, the external appearance of molding mechanism 10 is the same for either embodiment.

Figure 14B:
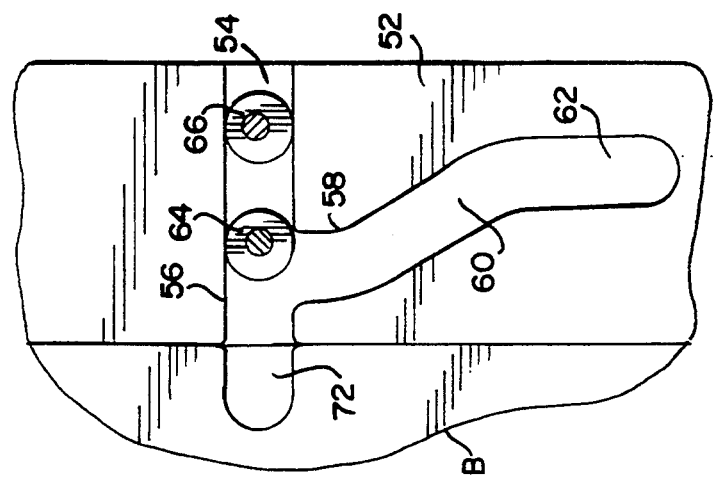
FIG. 14B, taken along line 14B—14B of FIG. 14A, shows a partial top sectional view of the moving cam bar and the cam followers.
Figure 14A:
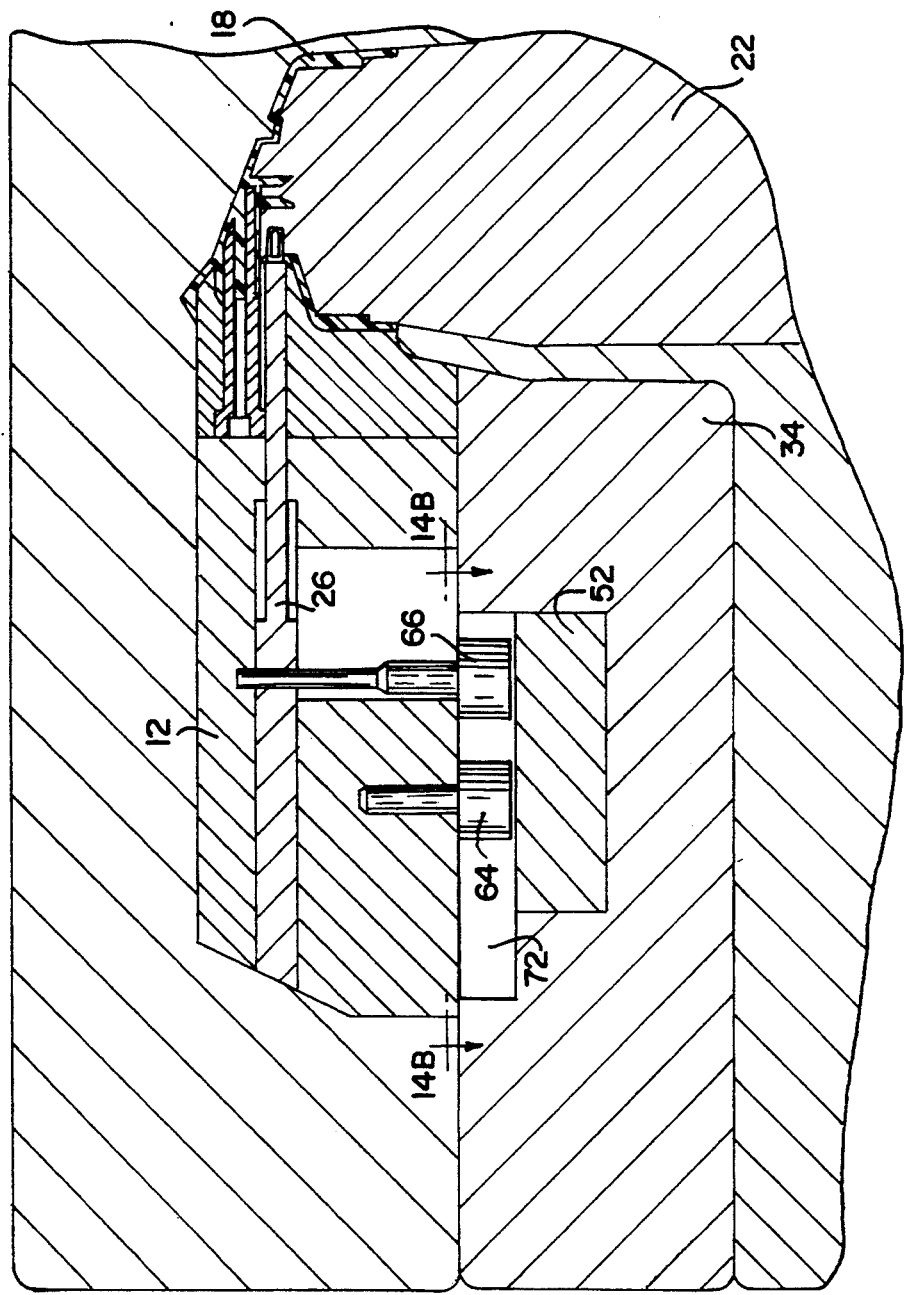
Figure 15A:
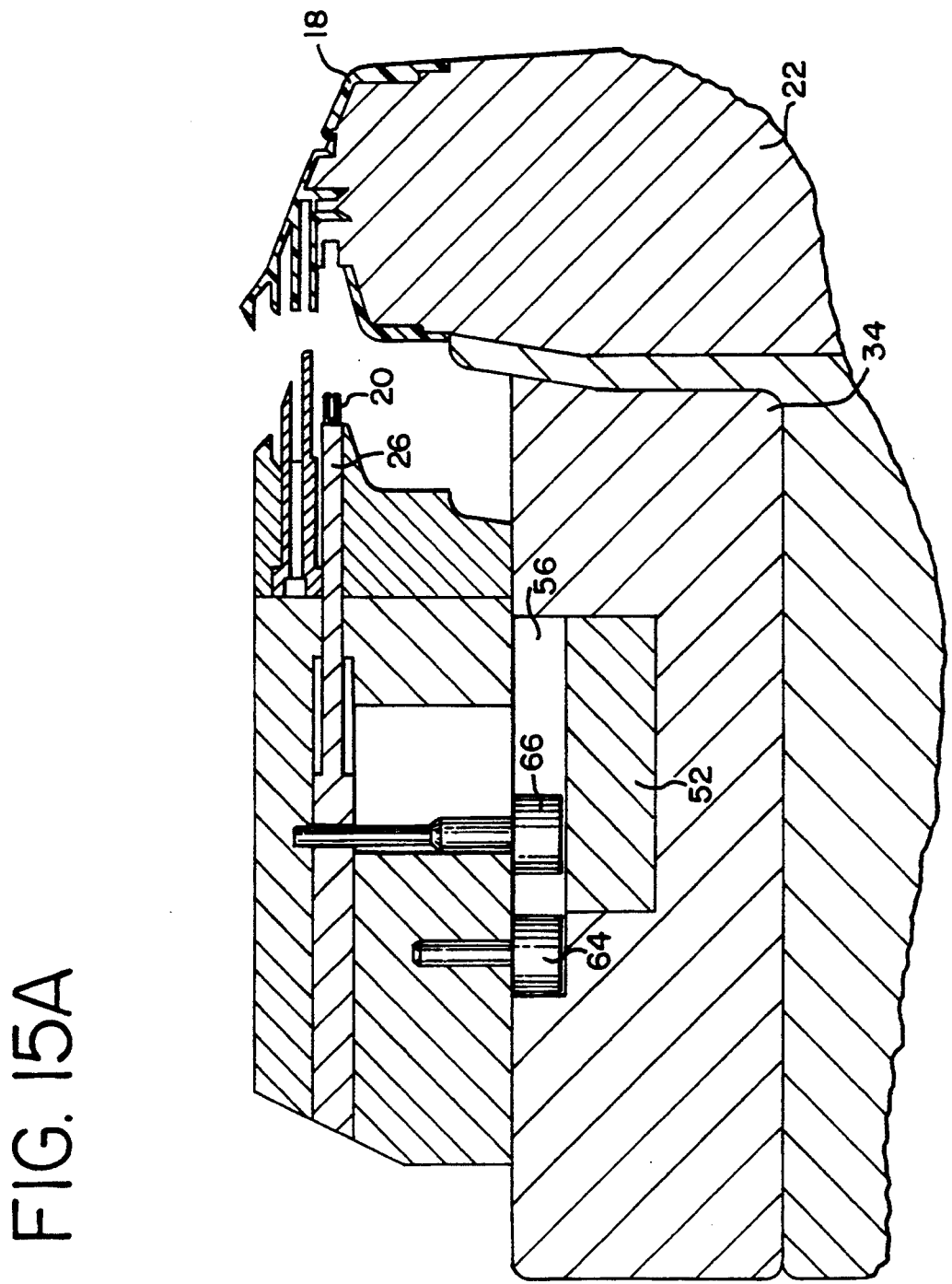
FIG. 15A shows the same elements as depicted in FIG. 14A (except for mold component A), but in positions corresponding to the retraction of the inserting pin.
Figure 16C:
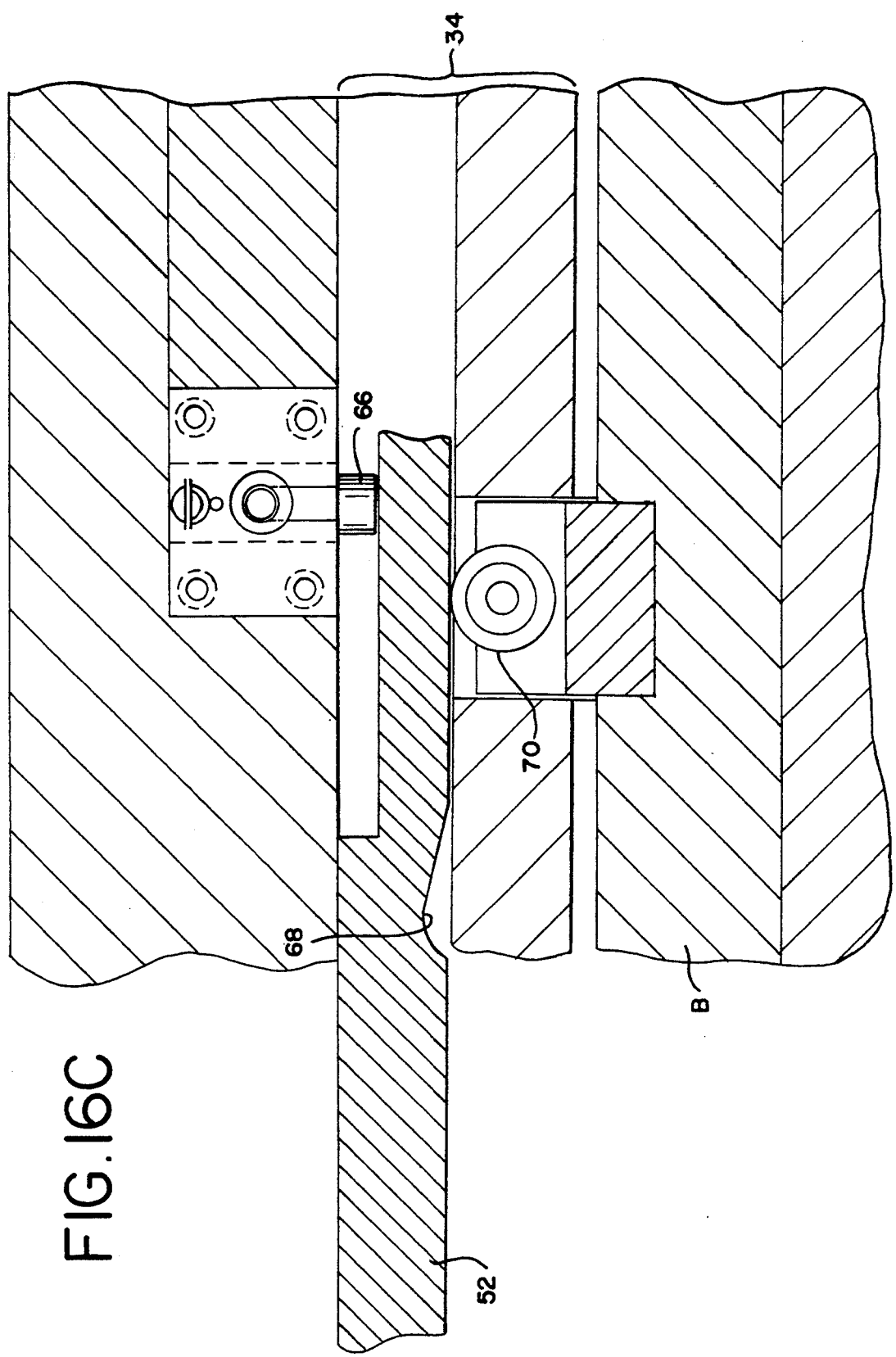
FIG. 16C shows the same elements depicted in FIG. 15B but in positions corresponding to FIG. 16A.
Figure 18B:
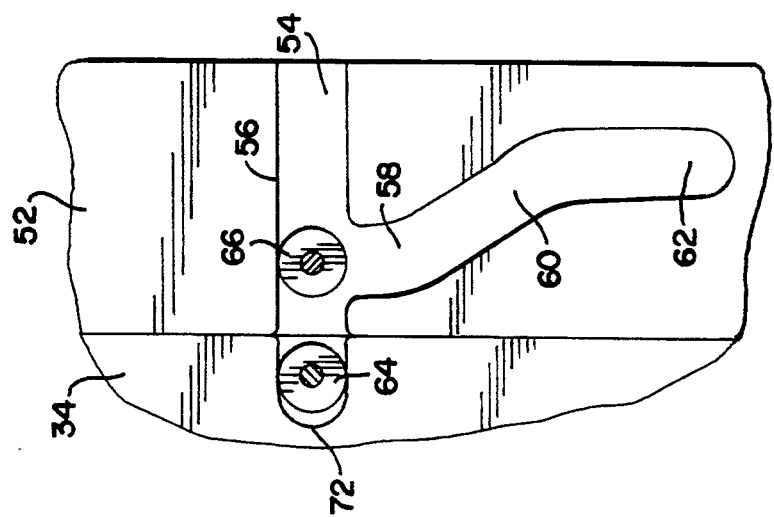
Figure 18A:
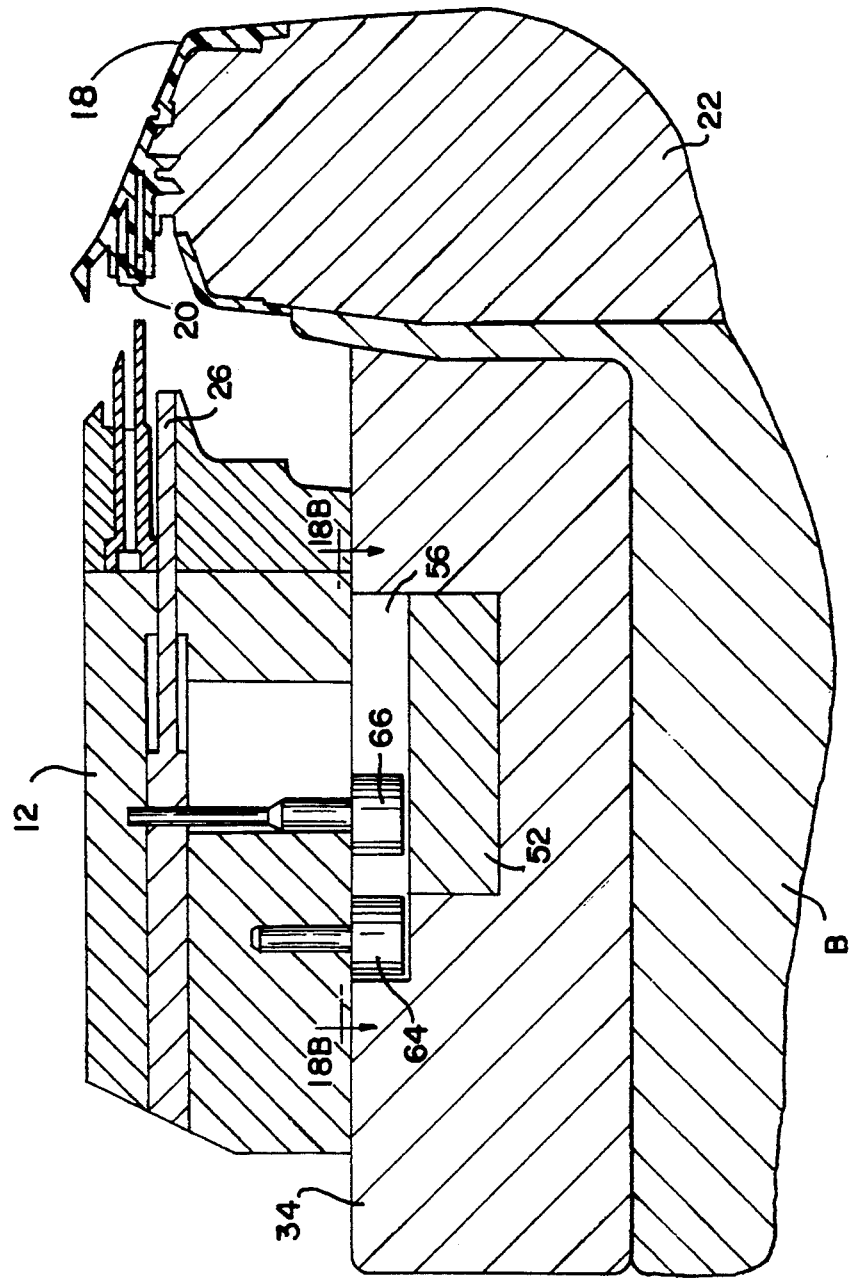
FIG. 18A shows the same elements as FIG. 15A, but in positions corresponding with the assembly process after insertion of the nozzle insert and retraction of the inserting pin.

FIG. 14A shows in partial section those parts of molding mechanism 10 that are connected to mold component B, in the same relative positions as they are depicted and described above by FIG. 3. Slide 12, within which insert engaging pin 26 is moveably located, is slidably connected to riser plate 34.

In this embodiment, positioned within the interior side of riser plate 34 is moving cam bar 52, which is shown in partial top view in FIG. 14B and in side view in FIG. 15B. Moving cam bar 52 has formed in the top or inner surface thereof (facing riser plate 34) T-shaped cam channel 54. T-shaped cam channel 54 is made up of cam channel top leg 56 and cam channel bottom leg 58. (See FIG. 16B.)

Cam channel bottom leg 58 has two main sections: angled leg neck section 60, which, after an initial connection portion where it joins cam channel top leg 56, is angled, preferably at a 30° angle, away from the perpendicular. Cam leg base section 62 is configured so as to be essentially perpendicular to cam channel top leg 56, preferably at an angle of 2° from the perpendicular, to allow for increased pressure on insert engaging pin 26 and fine adjustment of the final insertion location for spray nozzle insert 20.

As described before, as mold components A and B are brought together, slide 12 is positioned forward relative to riser plate 34 by the motion of slide 12 relative to diagonal cam pin 38.

As stated before, the difference between the first and the second embodiments lies in the operating mechanism that controls the relative assembly steps. It is the relative motions of a first and a second cam follower and a cam roller within their respective moveable locations that control these actions.

The relative motions of cam roller 70 and cam roller pocket 68 control the motion of riser plate 34 relative to mold component B (positioning insert engaging pin 26) and the relative motions of first cam follower 64 and second cam follower 66, both relative to T-shaped cam channel 54, and cam follower pocket 72 control the relative motions of slide 12.

Moving cam bar 52 has formed within its top surface T-shaped cam channel 54, as described before. Within T-shaped cam channel 54 moveably rest first cam follower 64, which is connected to slide 12, and second cam follower 66, which is connected to insert engaging pin 26.

As shown in FIG. 15B, formed into the bottom surface of moving cam bar 52 (opposite the side containing T-shaped cam channel 54) is cam roller pocket 68. Rotatably attached to mold component B is cam roller 70 which, when mold components A and B are closed, rests within cam roller pocket 68.

When mold component A and mold component B are separated, before all molding and assembly steps, first cam follower 64 is located within cam follower pocket 72 which, in this position, is coextensive with cam channel top leg 56 (in moving cam bar 52), and is located within riser plate 34, and second cam follower 66 is located within cam channel top leg 56.

As mold component B moves toward mold component A, moveable slide 12 moves forward, as shown in FIG. 14A. In this position, injection molding is accomplished in the same manner as described before. After injection molding of the actuator-overcap and spray nozzle insert has been completed, mold components A and B separate. Slide 12 moves backward relative to riser plate 34, pulling spray nozzle insert 20 out of its molded position within actuator-overcap forming core 22, all as described before with reference to embodiment one (see FIGS. 15A and 15B).

After injection molding has formed actuator-overcap 18 and spray nozzle insert 20, the assembly operations begin. At this point, hydraulic pressure moves moving cam bar 52 relative to slide 12, and two types of motion begin to occur simultaneously—riser plate 34 and insert engaging pin 26 both move to perform a sequential operation which results in the inserting of spray nozzle insert 20 into actuator overcap 18.

Moving cam bar 52 is moved relative to cam roller 70, which is connected to mold component B. As moving cam bar 52 moves over cam roller 70, cam roller pocket 68 is moved away from its position over cam roller 70. Since cam roller 70 projects above the inner surface of mold component B (see FIG. 16C), riser plate 34 is forced, by this action, away from the surface of mold component B. This positions insert engaging pin 26 (with spray nozzle insert 20) in line with actuator-overcap outlet structure 30 (see FIGS. 16A and 16B). Second cam follower 66 is moved by the motion of moving cam bar 52 downward into cam channel bottom leg 58 of angled T-shaped cam channel 54. Since second cam follower 66 is attached to insert engaging pin 26, this action forces insert engaging pin 26 relatively forward, and results in spray nozzle insert 20 being inserted into actuator-overcap outlet structure 30 (see FIGS. 17A and 17B). While this is happening, first cam follower 64 is retained in cam follower pocket 72, which prevents slide 12 from moving during the insert assembly process. The hydraulic pressure is then reversed, and all components, moving cam bar 52, first cam follower 64, and second cam follower 66, return to the positions shown in FIGS. 18A and 18B.

The assembled actuator-overcap with the spray nozzle insert is now ejected from the molding assembly by conventional mold ejection technology.

Other modifications of the molding mechanism of the present invention will become apparent to those skilled in the art from an examination of the above patent specification and drawings. Therefore, other variations of the present invention may be made which fall within the scope of the following claims even though such variations were not specifically discussed above.

INDUSTRIAL APPLICABILITY

This invention could be used to produce any molded item that, due to design or uniqueness, must be made in multiple pieces and then put together in a secondary operation. Through use of hydraulics, pneumatics, mechanical devices, and combination of these existing molding techniques, the assemblies can be made in a single cycle within an injection mold to make the part manufactured more cost efficient. Examples would be push/pull dispenser caps, aerosol spray buttons and overcaps, pump spray devices, makeup cases, two-piece plastic snap-together containers, etc. Molded parts can be held together by either an interference fit or by snap locking retainers designed into the plastic part.

What I claim:

1. A molding mechanism which simultaneously forms, from injected thermoplastic material, a first molded part and a second molded part, the first and the second molded parts being configured to fit together to form a single component assembly, the second molded part being intended to be joined to the first molded part, and wherein in a single sequence of operations, the molding mechanism detaches the second molded part from its molding position, and repositions and inserts the second molded part into an opening in the first molded part while the first molded part is still located within its mold cavity, the molding mechanism comprising:

an A mold component having formed therein a primary mold cavity for forming the first molded part, a B mold component having protruding therefrom a mold core, the mold core having formed therein a secondary mold cavity for forming the second molded part, access means for allowing injected thermoplastic material to reach the primary and secondary mold cavities to form the first and second molded parts, respectively, moveably connected to the B mold component, means for repositioning and inserting the second molded part into an opening in the first molded part, the A and B mold components, when fitted together, being configured to form the first molded part within a molding gap between the mold core and the primary mold cavity, and to form the second molded part between the secondary mold cavity and a part engaging pin which is movably attached to the means for repositioning and inserting the second molded part, the A and B mold components being designed to be separated after the simultaneous formation of the first molded part and the second molded part, during which separation the means for repositioning and inserting the second molded part causes the second molded part to be removed out of its formation position within the secondary cavity, moved at least axially away from its formation position within the secondary cavity so as to be repositioned to an insertion position located axially in line with the opening in the first molded part and then axially inserted into the opening in the first molded part to form the single component assembly, and movably located upon the B mold component, means for stripping the single component assembly from the molding mechanism after the second molded part has been inserted into the first molded part, and after separation of the A and B mold components.

2. A molding mechanism according to claim 1, wherein the means for repositioning and inserting the second molded part comprises, movably connected to the B mold component, an independently moveable riser plate upon which is mounted a slide and, located upon the slide, the part engaging pin, the slide, riser plate, and the part engaging pin, all attached to the B mold component, being designed to operatively engage the A mold component so that, when the A and B mold components are fitted together and thermoplastic material is injected to form the first and second molded parts, the part engaging pin moves into the secondary cavity and forms an-attachment to the second molded part, and, as the A and B mold components are separated, the combination of the slide, riser plate, and part engaging pin moves laterally and axially away from the mold core, thus detaching the second molded part from the secondary cavity, the riser plate then moves relative to the slide so as to position the second molded part to the insertion position axially in line with the opening in the formed first molded part, the part engaging pin then moves axially forward, inserting the second molded part into the opening in the first molded part, and then the part engaging pin retracts, and thereafter, the A and B mold components are further separated and the formed single component assembly is stripped from the molding mechanism by the stripping means.

3. A molding mechanism according to claim 2, wherein motion of a combination of the slide and the part engaging pin relative to the riser plate is controlled by a diagonal cam pin, motion of the riser plate relative to the B mold component is controlled by a two-part cam mechanism, which has a straight stationary cam bar portion, located on the A mold component, which is designed to interact with a moveable cam located on the B mold component, and motion of the part engaging pin relative to the slide being independently controlled by pneumatic pressure applied to the part engaging pin.

4. A molding mechanism according to claim 2, wherein motion of the riser plate relative to the B mold component is controlled by a diagonal cam pin, and motions of the slide relative to the riser plate, of the part engaging pin relative to the slide, and of the riser plate relative to the B mold component are all controlled by hydraulic pressure which activates a single cam mechanism, the cam mechanism comprising a moving cam bar having formed into one surface thereof an essentially T-shaped channel, and having first and second cam followers moveable within the essentially T-shaped channel, the first cam follower being connected to the slide and the second cam follower being connected to the part engaging pin, the moving cam bar further having, formed into a surface opposite the one containing the essentially T-shaped cam channel, a cam roller pocket that allows a cam roller, rotatably connected to the B mold component, to rest therein when the A and B mold components are joined.

5. A molding mechanism which simultaneously forms, from injected thermoplastic material, an actuator-overcap for a pressurized container and a spray nozzle insert intended and configured to fit within a fluid discharge outlet in the actuator-overcap, and then, in a single sequence of operations, detaches the spray nozzle insert from its molding position and repositions and then inserts the spray nozzle insert into the fluid discharge outlet in the actuator-overcap while the actuator-overcap is still located within its mold cavity, the molding mechanism comprising:

an A mold component having formed therein an actuator-overcap forming cavity, a B mold component having protruding therefrom an actuator-overcap forming core, the actuator-overcap forming core having formed therein a spray nozzle insert forming cavity, access means for allowing injected thermoplastic material to reach the actuator-overcap forming cavity and the spray nozzle insert forming cavity, movably connected to the B mold component, means for repositioning and inserting the spray nozzle insert within the fluid discharge outlet of the actuator-overcap, the A and B mold components, when fitted together, being configured to form the actuator-overcap within a molding gap between the actuator-overcap forming core and the actuator-overcap forming cavity and to form the spray nozzle insert between the spray nozzle insert forming cavity and an insert engaging pin which is movably attached to the means for repositioning and inserting the spray nozzle insert, the A and B mold components being designed to be separated after the simultaneous formation of the actuator-overcap and the spray nozzle insert, during which separation the means for repositioning and inserting the spray nozzle insert causes the spray nozzle insert to be detached from its formation position within the spray nozzle insert forming cavity, moved at least axially away from its formation position within the spray nozzle insert forming cavity so as to be repositioned to an insertion position located axially in line with the fluid discharge outlet of the actuator-overcap, and then axially inserted into the fluid discharge outlet to form a single component assembly, and movably located within the B mold component, means for stripping the single component assembly from the molding mechanism after insertion of the formed spray nozzle insert into the fluid discharge outlet of the actuator-overcap, and after further separation of the A and B mold components.

6. A molding mechanism according to claim 5, wherein the means for repositioning and inserting the spray nozzle insert comprises, movably connected to the B mold component, an independently moveable riser plate on which is mounted a slide and, located upon the slide, the insert engaging pin, the slide, riser plate, and insert engaging pin, all attached to the B mold component, being designed to operatively engage the A mold component so that, when the A and B mold components are fitted together and thermoplastic material is injected into the molding gap, the actuator-overcap and the spray nozzle insert are formed by the injected thermoplastic material, the insert engaging pin fits into the spray nozzle insert forming cavity within the actuator-overcap forming core within the B mold component and forms an attachment to the spray nozzle insert, and, as the A and B mold components are separated, the combination of the slide, riser plate, and insert engaging pin moves laterally and axially away from the actuator-overcap core, thus detaching the spray nozzle insert from the spray nozzle insert forming cavity, the riser plate then moves relative to the slide so as to reposition the spray nozzle insert to the insertion position axially in line with the fluid discharge outlet of the formed actuator-overcap, the insert engaging pin then moves axially forward, inserting the spray nozzle insert into the fluid discharge outlet of the actuator overcap, and then the insert engaging pin retracts, and thereafter, the formed actuator-overcap with the spray nozzle insert is stripped off the actuator-overcap core upon the B mold by the stripping means.

7. A molding mechanism according to claim 6, wherein motion of a combination of the slide and the insert engaging pin relative to the riser plate is controlled by a diagonal cam pin, motion of the riser plate relative to the B mold component is controlled by a two-part cam mechanism, which has a straight stationary cam bar portion located on the A mold component, which is designed to interact with a moveable cam located on the B mold component, and motion of the insert engaging pin relative to the slide being independently controlled by pneumatic pressure applied to the insert engaging pin.

8. A molding mechanism according to claim 6, wherein motion of the riser plate relative to the B mold component is controlled by a diagonal cam pin, and motions of the slide relative to the riser plate, of the insert engaging pin relative to the slide, and of the riser plate relative to the B mold component are all controlled by hydraulic pressure which activates a single cam mechanism, the cam mechanism comprising a moving cam bar having formed into one surface thereof an essentially T-shaped channel, and having first and second cam followers moveable within the essentially T-shaped channel, the first cam follower being connected to the slide and the second cam follower being connected to the insert engaging pin, the moving cam bar further having, formed into a surface opposite the one containing the essentially T-shaped cam channel, a cam roller pocket that allows a cam roller, rotatably connected to the B mold component, to rest therein when the A and B mold components are joined.

9. A molding mechanism according to claim 7, wherein the actuator-overcap core and cavity are so configured as to form, integrally with the actuator-overcap, an actuator button and a fluid transfer channel, the fluid transfer channel having at a first end thereof a fluid inlet opening and at a second end thereof the fluid discharge outlet, the fluid discharge outlet forming, in cooperation with the spray nozzle insert, a swirl chamber for nebulizing a fluid released from a pressurized aerosol container by the actuator button acting upon a valve of the pressurized aerosol container, the swirl chamber being formed by and between one or more channels formed into an inner base surface of the spray nozzle insert and one or more protrusions formed upon an outer surface of the fluid discharge outlet and being formed by the spray nozzle insert and the fluid discharge outlet being telescoped together when the spray nozzle insert is inserted into the fluid discharge outlet.

10. A molding mechanism according to claim 8, wherein the actuator-overcap core and cavity are so configured as to form, integrally with the actuator-overcap, an actuator button and a fluid transfer channel, the fluid transfer channel having at one end thereof a fluid inlet opening and at the other end thereof the fluid discharge outlet, the fluid discharge outlet forming, in cooperation with the spray nozzle insert, a swirl chamber for nebulizing a fluid released from a pressurized aerosol container by the actuator button acting upon a valve of the pressurized aerosol container, the swirl chamber being formed by and between one or more channels formed into an inner base surface of the spray nozzle insert and one or more protrusions formed upon an outer surface of the fluid discharge outlet and being formed by the spray nozzle insert and the fluid discharge outlet being telescoped together when the spray nozzle insert is inserted into the fluid discharging outlet.

11. A method of simultaneously forming, in the same mold, two parts intended to be joined, the parts being a first molded part having an opening and a second molded part, and then joining the two parts by inserting the second molded part into the opening in the first molded part while the first molded part is still located within its mold cavity, the method comprising the steps of:

providing a molding mechanism having (i) an A mold component which has formed therein a primary mold cavity for forming the first molded part, (ii) a B mold component having protruding therefrom a mold core, the mold core having formed therein a secondary mold cavity for forming the second molded part, (iii) access means for allowing injected thermoplastic material to reach the primary and secondary mold cavities to form the first and second molded parts, respectively and, (iv) movably connected to the B mold component, means for repositioning and inserting the second molded part into the opening in the first molded part while the first molded part is still located within the primary mold cavity, wherein the A and B mold components, when fitted together, are configured to form the first molded part within a molding gap between the mold core and the primary cavity and to form the second molded part between the secondary cavity and a part engaging pin which is movably attached to the means for repositioning and inserting the second molded part, and wherein the A and B mold components are designed to be separated after the simultaneous formation of the first molded part and the second molded part, during which separation the means for repositioning and inserting the second molded part causes the second molded part to be removed out of its formation position within the secondary cavity, moved at least axially away from its formation position within the secondary cavity to be repositioned to an insertion position located axially in line with the opening in the first molded part and then axially inserted into the opening in the first molded part to form a single component assembly, and thereafter, the formed single component assembly, after further separation of the A and B mold components, being stripped from the molding mechanism, forcing the provided B mold component against the A mold component, injecting, through the access means, a thermoplastic material into the molding gap between the mold core and the primary cavity as well as into a molding gap between the secondary cavity and the part engaging pin to simultaneously form the first molded part and second molded part, moving the B mold component away from the A mold component, causing the second molded part to be removed out of its formation position by the part engaging pin, moved at least axially away from its formation position within the secondary cavity so as to be repositioned to an insertion position located axially in line with the opening in the formed first molded part, and causing the part engaging pin to then move axially forward, inserting the second molded part into the opening of the formed first molded part to form a single component assembly, and then causing the part engaging pin to retract, and stripping the formed single component assembly from its formation position.

12. A method according to claim 11, wherein the means for repositioning and inserting the second molded part into the first molded part comprises, movably connected to the B mold component, an independently moveable riser plate on which is mounted a slide and, located upon the slide, the part engaging pin, the slide, riser plate, and the part engaging pin, which are all attached to the B mold component, are all designed to operatively engage the A mold component so that, when the A and B mold components are fitted together and thermoplastic material is injected into the molding gap to form the first and the second molded parts, the part engaging pin fits into the secondary cavity and forms an attachment to the second molded part, and, as the A and B mold components are separated, the combination of the slide, riser plate, and part engaging pin moves laterally and axially away from the mold core, thus removing the second molded part from the secondary cavity, the riser plate then moves relative to the slide so as to reposition the second molded part to the insertion position located axially in line with the opening in the formed first molded part, the part engaging pin then moves axially forward, inserting the second molded part into the opening in the first molded part, and then the part engaging pin retracts, and thereafter, the A and B mold components are further separated and the formed single component mechanism is stripped from the molding mechanism.

13. A method according to claim 12, further comprising controlling motion of a combination of the slide and the part engaging pin relative to the riser plate by a diagonal cam pin, motion of the riser plate relative to the B mold component by a two-part cam mechanism, which has a straight stationary cam bar portion located on the A mold component designed to interact with a moveable cam portion located on the B mold component, and motion of the part engaging pin relative to the slide independently by pneumatic pressure applied to the part engaging pin.

14. A method according to claim 12, further comprising controlling motion of the riser plate relative to the B mold component by a diagonal cam pin, and motions of the slide relative to the riser plate, of the part engaging pin relative to the slide, and of the riser plate relative to the B mold component by hydraulic pressure which activates a single cam mechanism, the cam mechanism comprising a moving cam bar having formed into one surface thereof an essentially T-shaped channel, and having first and second cam followers moveable within the essentially T-shaped channel, the first cam follower being connected to the slide and the second cam follower being connected to the part engaging pin, the moving cam bar further having, formed into a surface opposite the one containing the essentially T-shaped cam channel, a cam roller pocket that allows a cam roller rotatably connected to the B mold component to rest therein, when the A and B mold components are joined.

15. A method of, first, simultaneously forming, in the same mold, two parts intended to be joined, the parts being an actuator-overcap having a fluid discharge outlet and a spray nozzle insert therefor, and second, assembling those parts while the actuator-overcap is still located within its mold cavity, the method comprising the steps of:

providing a molding mechanism having (i) an A mold component which has formed therein an actuator-overcap forming cavity, (ii) a B mold component having protruding therefrom an actuator-overcap forming core, the core having formed therein a spray nozzle insert forming cavity, (iii) access means for allowing injected thermoplastic material to reach the actuator-overcap cavity and the spray nozzle insert forming cavity, and, (iv) detachably connected to the B mold component, means for repositioning and inserting the spray nozzle insert within the fluid discharge outlet of the actuator-overcap while the actuator-overcap is still located within the actuator-overcap forming cavity, wherein the A and B mold components, when fitted together, are configured to form the actuator-overcap within a molding gap between the actuator-overcap forming core and the actuator-overcap forming cavity and to form the spray nozzle insert between the spray nozzle insert forming cavity and a spray nozzle insert engaging pin movably attached to the means for repositioning and inserting the spray nozzle insert, and wherein the A and B mold components are designed to be separated after the simultaneous formation of the actuator-overcap and the spray nozzle insert, during which separation the means for repositioning and inserting the spray nozzle insert causes the spray nozzle insert to be removed out of its formation position within the actuator-overcap forming cavity, moved at least axially away from its formation position within the actuator-overcap forming cavity so as to be repositioned to an insertion position located axially in line with the fluid discharge outlet of the actuator-overcap, and then axially inserted into the fluid discharge outlet, forcing the provided B mold component against the A mold component, injecting, through the access means, a thermoplastic material into the actuator-overcap forming cavity and the spray nozzle insert forming cavity to form the actuator-overcap and the spray nozzle insert from the thermoplastic material, moving the B mold component away from the A mold component, causing the spray nozzle insert to be detached from its formation position by the insert engaging pin and moved at least axially away from its formation position so as to be repositioned to the insertion position located axially in line with the fluid discharge outlet of the actuator-overcap, causing the insert engaging pin to move forward relative to a slide within which it is mounted, thus axially inserting the spray nozzle insert into the fluid discharge outlet of the actuator-overcap to assemble the actuator-overcap with the spray nozzle insert, and stripping the assembled actuator-overcap with its spray nozzle insert from its position on the actuator-overcap forming core.

16. A method according to claim 15, wherein the means for repositioning and inserting the spray nozzle insert comprises, detachably connected to the B mold component, an independently moveable riser plate on which is mounted the slide and, located upon the slide, the insert engaging pin, the slide, riser plate, and insert engaging pin, which are all attached to the B mold component, all being designed to operatively engage the A mold component so that, when the A and B mold components are fitted together and thermoplastic material is injected into the molding gap in the molding mechanism to form the actuator-overcap and the spray nozzle insert, the insert engaging pin fits into the insert forming cavity within the actuator-overcap forming core of the A mold component and forms an attachment to the spray nozzle insert, and, as the A and B mold components are separated, the combination of the slide, riser plate, and insert engaging pin moves laterally and axially away from the actuator-overcap core, thus removing the spray nozzle insert from the insert forming cavity and positioning the spray nozzle insert to the insertion position axially in line with the fluid discharge outlet of the formed actuator-overcap, the insert engaging pin then moves axially forward, inserting the spray nozzle insert into the fluid discharge outlet, and then the insert engaging pin retracts, and thereafter, the formed actuator-overcap with the spray nozzle insert is stripped off the actuator-overcap core on the B mold component.

17. A method according to claim 16, further comprising controlling motion of a combination of the slide and the insert pin relative to the riser plate by a diagonal cam pin, motion of the riser plate relative to the B mold component by a two-part cam mechanism, which has a straight stationary cam bar portion located on the A mold component which is designed to interact with a moveable cam portion located on the B mold component, and motion of the insert engaging pin relative to the slide independently by pneumatic pressure applied to the insert engaging pin.

18. A method according to claim 16, further comprising controlling motion of the riser plate relative to the B mold component by a diagonal cam pin, and motions of the slide relative to the riser plate, of the insert engaging pin relative to the slide, and of the riser plate relative to the mold component by hydraulic pressure which activates a single cam mechanism, the cam mechanism comprising a moving cam bar having formed into one surface thereof an essentially T-shaped channel, and having first and second cam followers moveable within the essentially T-shaped channel, the first cam follower being connected to the slide and the second cam follower being connected to the insert engaging pin, the moving cam bar further having, formed into a surface opposite the one containing the essentially T-shaped cam channel, a cam roller pocket that allows a cam roller rotatably connected to the B mold component to rest therein, when the A and B mold components are joined.

19. A method according to claim 17, wherein the actuator-overcap core and cavity are so configured as to form, integrally with the actuator-overcap, an actuator button and a fluid transfer channel, the fluid transfer channel having at one end thereof the fluid inlet opening and at the other end thereof a fluid discharge outlet, the fluid discharge outlet forming, in cooperation with the spray nozzle insert, a swirl chamber for nebulizing a pressurized fluid released from a pressurized aerosol container by the actuator button acting upon a valve of the pressurized aerosol container, the swirl chamber being formed by and between one or more channels formed into an inner base surface of the spray nozzle insert and one or more protrusions formed upon an outer surface of the fluid discharge outlet and being formed by the spray nozzle insert and the fluid discharge outlet being telescoped together when the spray nozzle insert is inserted into the fluid discharge outlet.

20. A method according to claim 18, wherein the actuator-overcap core and cavity are so configured as to form, integrally with the actuator-overcap, an actuator button and a fluid transfer channel, the fluid transfer channel having at one end thereof a fluid inlet opening and at the other end thereof the fluid discharge outlet, the fluid discharge outlet forming, in cooperation with the spray nozzle insert, a swirl chamber for nebulizing a pressurized fluid released from a pressurized aerosol container by the actuator button acting upon a valve of the pressurized aerosol container, the swirl chamber being formed by and between one or more channels formed into an inner base surface of the spray nozzle insert and one or more protrusions formed upon an outer surface of the fluid discharge outlet and being formed by the spray nozzle insert and the fluid discharge outlet being telescoped together when the spray nozzle insert is inserted into the fluid discharge outlet.

* * * * *

UNITED STATES PATENT AND TRADEMARK OFFICE
CERTIFICATE OF CORRECTION

PATENT NO : 5,378,422
DATED : January 3, 1995
INVENTOR(S): D. James Musiel et al.

It is certified that error appears in the above-identified patent and that said Letters Patent is hereby corrected as shown below:

Column 16, Line 6, "insert pin" should read --insert engaging pin--.

Column 16, Line 20, "the mold" should read --the B mold--.

Signed and Sealed this

Twentieth Day of June, 2000

Attest:

Q. TODD DICKINSON

*Attesting Officer*    *Director of Patents and Trademarks*